US009879893B2

(12) United States Patent
Luo et al.

(10) Patent No.: US 9,879,893 B2
(45) Date of Patent: Jan. 30, 2018

(54) AIR CONDITIONING SYSTEM, METHOD FOR CONTROLLING AIR CONDITIONING SYSTEM, AND OUTDOOR APPARATUS OF AIR CONDITIONING SYSTEM

(71) Applicants: GD MIDEA HEATING & VENTILATING EQUIPMENT CO., LTD., Foshan (CN); MIDEA GROUP CO., LTD., Foshan (CN)

(72) Inventors: Bin Luo, Foshan (CN); Fudang Wei, Foshan (CN)

(73) Assignees: GD Midea Heating & Venting Equipment Co., Ltd., Foshan (CN); Midea Group Co., Ltd., Foshan (CN)

( * ) Notice: Subject to any disclaimer, the term of this patent is extended or adjusted under 35 U.S.C. 154(b) by 394 days.

(21) Appl. No.: 14/472,049

(22) Filed: Aug. 28, 2014

(65) Prior Publication Data
US 2015/0204594 A1 Jul. 23, 2015

(30) Foreign Application Priority Data

Jan. 21, 2014 (CN) .......................... 2014 1 0028569
Jan. 21, 2014 (CN) .......................... 2014 1 0028602

(51) Int. Cl.
*F25B 1/00* (2006.01)
*F25B 49/02* (2006.01)
*F25B 13/00* (2006.01)

(52) U.S. Cl.
CPC ............ *F25B 49/022* (2013.01); *F25B 13/00* (2013.01); *F25B 2313/005* (2013.01); *F25B 2313/0294* (2013.01); *F25B 2600/0253* (2013.01); *F25B 2700/1931* (2013.01); *F25B 2700/1933* (2013.01); *F25B 2700/2106* (2013.01); *Y02B 30/741* (2013.01)

(58) Field of Classification Search
USPC ........................................... 62/115
See application file for complete search history.

(56) References Cited

U.S. PATENT DOCUMENTS

| 4,803,848 A * | 2/1989 | LaBrecque ............... F25B 1/00 62/173 |
| 4,901,534 A * | 2/1990 | Nakatsuno ............ F25B 47/022 62/155 |

FOREIGN PATENT DOCUMENTS

| CN | 202328540 U | 7/2012 |
| CN | 103471215 A | 12/2013 |
| JP | 2008249267 A | 10/2008 |

OTHER PUBLICATIONS

Office action from SIPO for CN application 201410028602.8 dated Mar. 2, 2017, 8 pages.

(Continued)

*Primary Examiner* — Lauren Crane
(74) *Attorney, Agent, or Firm* — Lathrop Gage LLP

(57) ABSTRACT

An air conditioning system, an outdoor apparatus of an air conditioning system and a method for controlling an air conditioning system are provided. The air conditioning system includes: an indoor apparatus and an outdoor apparatus. The outdoor apparatus includes a variable-frequency compressor and a controller configured to perform a variable-frequency control on the variable-frequency compressor according to operation parameters of the variable-frequency compressor and independent from the indoor apparatus.

6 Claims, 9 Drawing Sheets

(56) References Cited

OTHER PUBLICATIONS

English translation of office action from SIPO for CN application 201410028602.8 dated Mar. 2, 2017, 10 pages.

\* cited by examiner

AIR CONDITIONING SYSTEM, METHOD FOR CONTROLLING AIR CONDITIONING SYSTEM, AND OUTDOOR APPARATUS OF AIR CONDITIONING SYSTEM

CROSS REFERENCE TO RELATED APPLICATIONS

This application claims priority and benefits of Chinese Patent Applications No. 201410028569.9 and 201410028602.8, filed with State Intellectual Property Office on Jan. 21, 2014, the entire content of which is incorporated herein by reference.

FIELD

Embodiments of the present invention generally relate to an air conditioning technology field, and more particularly, to a method for controlling an air conditioning system, an outdoor apparatus of an air conditioning system and an air conditioning system.

BACKGROUND

With the increasing development of the air conditioning technology, the DC variable-frequency air conditioner draws more and more attentions. Currently, all conventional variable-frequency air conditioners need dedicated installation, and the indoor apparatus and the outdoor apparatus need special communication mode so as to control the compressor in the outdoor apparatus.

A structure of a conventional variable-frequency air conditioning system is shown in FIG. 1A. The outdoor apparatus receives a series of signals based on the specific transmission rule and sent from the indoor apparatus, including the on-off signal, the temperature determination signal and the indoor temperature signal, such that the compressor in the outdoor apparatus can be controlled to operate with certain frequency and the working frequency of the compressor can be adjusted according to the indoor temperature. In order to implement the control of each element in the outdoor apparatus, the indoor apparatus is required to send corresponding signals to the outdoor apparatus, such that the air conditioning system has disadvantages of complex structure and high cost.

SUMMARY

Embodiments of the present invention seek to solve at least one of the problems existing in the related art to at least some extent.

Embodiments of a first broad aspect of the present invention provide an air conditioning system. The air conditioning system includes an indoor apparatus and an outdoor apparatus. The outdoor apparatus includes: a variable-frequency compressor and a controller configured to perform a variable-frequency control on the variable-frequency compressor according to operation parameters of the variable-frequency compressor and independent from the indoor apparatus.

With the air conditioning system according to embodiments of the present invention, the controller of the outdoor apparatus in the air conditioning system performs the variable-frequency control on the variable-frequency compressor according to the operation parameters of the variable-frequency compressor, independent from the indoor apparatus and without transmitting corresponding control parameters between the indoor apparatus and the outdoor apparatus via a specific communication, thus reducing a complexity of the air conditioning system and saving a cost significantly.

In some embodiments, the outdoor apparatus further includes a communicator configured to receive an on-off instruction and a mode option instruction sent from a remote, a line controller or the indoor apparatus of the air conditioning system, and the controller performs the variable-frequency control on the variable-frequency compressor according to the operation parameters of the variable-frequency compressor and a working mode of the air conditioning system corresponding to the mode option instruction.

In some embodiments, the outdoor apparatus further includes a first pressure sensor disposed at an inlet of the variable-frequency compressor and configured to generate a first pressure detecting signal, when the working mode is a refrigerating mode.

In some embodiments, the outdoor apparatus further includes a second pressure sensor disposed at an outlet of the variable-frequency compressor and configured to generate a second pressure detecting signal, when the working mode is a heating mode.

In some embodiments, the controller is configured to generate a current refrigerant saturation temperature by selecting one of the first pressure detecting signal and the second pressure detecting signal selected according to the working mode, to obtain a target refrigerant saturation temperature, to perform the variable-frequency control on the variable-frequency compressor according to the target refrigerant saturation temperature and the current refrigerant saturation temperature, and to adjust the target refrigerant saturation temperature according to the operation parameters of the variable-frequency compressor during the variable-frequency control.

In some embodiments, the outdoor apparatus further includes a temperature sensor configured to detect a current ambient temperature of the outdoor apparatus, in which the controller determines the target refrigerant saturation temperature according to the current ambient temperature of the outdoor apparatus, when the outdoor apparatus is started for the first time in a predetermined working cycle.

In some embodiments, an adjusted target refrigerant saturation temperature is set as the refrigerant saturation temperature of the outdoor apparatus in a next start, when the outdoor apparatus is stopped.

In some embodiments, the operation parameters of the variable-frequency compressor comprise a working time of the variable-frequency compressor and a stop-start number of time of the variable-frequency compressor in a first predetermined period.

In some embodiments, when the working time of the variable-frequency compressor is larger than or equal to a first time threshold and the stop-start number of time of the variable-frequency compressor in the first predetermined period is larger than or equal to a first predetermined number of time threshold, the controller adjusts the target refrigerant saturation temperature according to a predetermined step length.

In some embodiment, the operation parameters of the variable-frequency compressor comprise a working time and a working frequency or a working current of the variable-frequency compressor.

In some embodiments, when the working time of the variable-frequency compressor is larger than or equal to a second time threshold, the controller obtains a current working frequency or a current working current of the variable-frequency compressor and a working frequency or a working current before of the variable-frequency compressor before a second predetermined period; when the current working frequency is less than the working frequency before the second predetermined period or the current working current is less than the working current before the second predetermined period, the controller keeps the target refrigerant saturation temperature unchanged; when the current working frequency is larger than or equal to the working frequency before the second predetermined period or the current working current is larger than or equal to the working current before the second predetermined period, the controller adjusts the target refrigerant saturation temperature according to a predetermined step length.

In some embodiments, the operation parameters of the variable-frequency compressor comprise a working time of the variable-frequency compressor and a stop-start number of time of the variable-frequency compressor in a third predetermined period, in which when the working time of the variable-frequency compressor is larger than or equal to a third time threshold, and the stop-start number of time of the variable-frequency compressor in the third predetermined period is larger than or equal to a second predetermined number of time threshold, and the target refrigerant saturation temperature is larger than or equal to a predetermined saturation temperature threshold, the controller adjusts the target refrigerant saturation temperature according to a predetermined step length.

In some embodiments, the operation parameters of the variable-frequency compressor comprise a working time and a working frequency or a working current of the variable-frequency compressor, in which when the working time of the variable-frequency compressor is larger than or equal to a fourth time threshold, and a current working frequency of the variable-frequency compressor is larger than or equal to a predetermined frequency threshold or a current working current of the variable-frequency compressor is larger than or equal to a predetermined current threshold, the controller adjusts the target refrigerant saturation temperature according to a predetermined step length.

In some embodiments, the operation parameters of the variable-frequency compressor comprise a working time of the variable-frequency compressor, in which when the working time of the variable-frequency compressor is larger than a fifth time threshold and the variable-frequency compressor has not stopped, the controller adjusts the target refrigerant saturation temperature according to a predetermined step length.

In some embodiments, when the working mode is the heating mode, the controller reduces the target refrigerant saturation temperature by the predetermined step length and returns the working time of the variable-frequency compressor to zero; when the working mode is the refrigerating mode, the controller increases the target refrigerant saturation temperature by the predetermined step length and returns the working time of the variable-frequency compressor to zero.

In some embodiments, after receiving the on-off instruction, the controller controls the outdoor apparatus to delay a predetermined period to start or stop.

Embodiments of a second broad aspect of the present invention provide a method for controlling an air conditioning system. The method includes: obtaining operation parameters of a variable-frequency compressor of an outdoor apparatus in the air conditioning system; and performing a variable-frequency control on the variable-frequency compressor of the outdoor apparatus according to the operation parameters of the variable-frequency compressor and independent from the indoor apparatus of the air conditioning system.

With the method for controlling the air conditioning system, the controller of the outdoor apparatus in the air conditioning system performs the variable-frequency control on the variable-frequency compressor in the outdoor apparatus according to the operation parameters of the variable-frequency compressor, independent from the indoor apparatus and without transmitting corresponding control parameters between the indoor apparatus and the outdoor apparatus via a specific communication, thus reducing a complexity of the air conditioning system and improving a reliability of the air conditioning system.

In some embodiments, the method further includes detecting a first pressure detecting signal via a first pressure sensor disposed at an inlet of the variable-frequency compressor, when a working mode of the air conditioning system is a refrigerating mode.

In some embodiments, the method further includes detecting a second pressure detecting signal via a second pressure sensor disposed at an outlet of the variable-frequency compressor, when the working mode is a heating mode.

In some embodiments, performing a variable-frequency control on the variable-frequency compressor of the outdoor apparatus according to the operation parameters of the variable-frequency compressor and independent from the indoor apparatus of the air conditioning system includes: generating a current refrigerant saturation temperature by selecting one of the first pressure detecting signal and the second detecting signal according to the working mode; obtaining a target refrigerant saturation temperature; performing the variable-frequency control on the variable-frequency compressor according to the target refrigerant saturation temperature and the current refrigerant saturation temperature, and adjusting the target refrigerant saturation temperature according to the operation parameters of the variable-frequency compressor during the variable-frequency control.

In some embodiments, the target refrigerant saturation temperature is determined according to a current ambient temperature of the outdoor apparatus, when the outdoor apparatus is started for the first time in a predetermined working cycle.

In some embodiments, an adjusted target refrigerant saturation temperature is set as the refrigerant saturation temperature of the outdoor apparatus in a next start, when the outdoor apparatus is stopped.

In some embodiments, the operation parameters of the variable-frequency compressor include a working time of the variable-frequency compressor and a stop-start number of time of the variable-frequency compressor in a first predetermined period, and adjusting the target refrigerant saturation temperature according to the operation parameters of the variable-frequency compressor includes: determining whether the working time of the variable-frequency compressor is larger than or equal to a first time threshold; if yes, obtaining the stop-start number of time of the variable-frequency compressor in the first predetermined period; and if the stop-start number of time of the variable-frequency compressor in the first predetermined period is larger than or equal to a first predetermined number of time threshold, adjusting the target refrigerant saturation temperature according to a predetermined step length.

In some embodiments, the operation parameters of the variable-frequency compressor include a working time and a working frequency or a working current of the variable-frequency compressor, and adjusting the target refrigerant saturation temperature according to the operation parameters of the variable-frequency compressor includes: determining whether the working time of the variable-frequency compressor is larger than or equal to a second time threshold; if yes, obtaining a current working frequency or a current working current of the variable-frequency compressor and a working frequency or a working current before of the variable-frequency compressor before a second predetermined period; if the current working frequency is less than the working frequency before the second predetermined period or the current working current is less than the working current before the second predetermined period, keeping the target refrigerant saturation temperature unchanged; if the current working frequency is larger than or equal to the working frequency before the second predetermined period or the current working current is larger than or equal to the working current before the second predetermined period, adjusting the target refrigerant saturation temperature according to a predetermined step length.

In some embodiments, the operation parameters of the variable-frequency compressor include a working time of the variable-frequency compressor and a stop-start number of time of the variable-frequency compressor in a third predetermined period, and adjusting the target refrigerant saturation temperature according to the operation parameters of the variable-frequency compressor includes: determining whether the working time of the variable-frequency compressor is larger than or equal to a third time threshold; if yes, obtaining the stop-start number of time of the variable-frequency compressor in the third predetermined period; and if the stop-start number of time of the variable-frequency compressor in the third predetermined period is larger than or equal to a second predetermined number of time threshold, determining whether the target refrigerant saturation temperature is larger than or equal to a predetermined saturation temperature threshold; if yes, adjusting the target refrigerant saturation temperature according to a predetermined step length.

In some embodiments, the operation parameters of the variable-frequency compressor include a working time and a working frequency or a working current of the variable-frequency compressor, and adjusting the target refrigerant saturation temperature according to the operation parameters of the variable-frequency compressor includes: determining whether the working time of the variable-frequency compressor is larger than or equal to a fourth time threshold; if yes, obtaining a current working frequency or a current working current of the variable-frequency compressor; determining whether the current working frequency of the variable-frequency compressor is larger than or equal to a predetermined frequency threshold or the current working current of the variable-frequency compressor is larger than or equal to a predetermined current threshold; if yes, adjusting the target refrigerant saturation temperature according to a predetermined step length.

In some embodiments, the operation parameters of the variable-frequency compressor include a working time of the variable-frequency compressor, and adjusting the target refrigerant saturation temperature according to the operation parameters of the variable-frequency compressor includes: determining whether the working time of the variable-frequency compressor is larger than or equal to a fifth time threshold; if the working time of the variable-frequency compressor is larger than or equal to the fifth time threshold, and the variable-frequency compressor has not stopped, adjusting the target refrigerant saturation temperature according to a predetermined step length.

In some embodiments, when the working mode is the heating mode, the target refrigerant saturation temperature is reduced by the predetermined step length and the working time of the variable-frequency compressor returns to zero; when the working mode is the refrigerating mode, the target refrigerant saturation temperature is increased by the predetermined step length and the working time of the variable-frequency compressor returns to zero.

In some embodiments, the method further includes controlling the outdoor apparatus to delay a first predetermined period to start or stop after receiving the on-off instruction.

Embodiments of a third broad aspect of the present invention provide an outdoor apparatus of an air conditioning system. The outdoor apparatus includes a variable-frequency compressor and a controller configured to control the variable-frequency compressor. The controller includes: a start module configured to obtain a working mode of the air conditioning system and to start the variable-frequency compressor according to the working mode of the air condition; a temperature control module configured to obtain a target refrigerant saturation temperature, and to adjust the target refrigerant saturation temperature according to operation parameters of the variable-frequency compressor during an variable-frequency control for the variable-frequency compressor; and a variable-frequency control module configured to perform the variable-frequency control on the variable-frequency compressor according to the target refrigerant saturation temperature.

With the outdoor apparatus of the air conditioning system according to embodiments of the present invention, the controller performs the variable-frequency control on the variable-frequency compressor in the outdoor apparatus according to the operation parameters of the variable-frequency compressor, independent from the indoor apparatus and without transmitting corresponding control parameters between the indoor apparatus and the outdoor apparatus via a specific communication, thus reducing a complexity of the air conditioning system and saving the cost significantly.

In some embodiment, the temperature control module is further configured to set an adjusted target refrigerant saturation temperature as the refrigerant saturation temperature of the outdoor apparatus in a next start, when the outdoor apparatus is stopped.

In some embodiments, the outdoor apparatus further includes a first pressure sensor disposed at an inlet of the variable-frequency compressor and configured to generate a first pressure detecting signal, when the working mode is a refrigerating mode.

In some embodiments, the outdoor apparatus further includes a second pressure sensor disposed at an outlet of the variable-frequency compressor and configured to generate a second pressure detecting signal, when the working mode is a heating mode.

In some embodiments, the temperature control module is configured to generate a current refrigerant saturation temperature by selecting one of the first pressure detecting signal and the second detecting signal according to the working mode and to obtain a target refrigerant saturation temperature, and the variable-frequency control module is configured to perform the variable-frequency control on the variable-frequency compressor according to the target refrigerant saturation temperature and the current refrigerant saturation temperature.

In some embodiments, the outdoor apparatus further includes a temperature sensor configured to detect a current ambient temperature of the outdoor apparatus, in which the temperature sensor determines the target refrigerant saturation temperature according to the current ambient temperature of the outdoor apparatus, when the outdoor apparatus is started for the first time in a predetermined working cycle.

In some embodiments, the operation parameters of the variable-frequency compressor include a working time of the variable-frequency compressor and a stop-start number of time of the variable-frequency compressor in a first predetermined period.

In some embodiments, when the working time of the variable-frequency compressor is larger than or equal to a first time threshold and the stop-start number of time of the variable-frequency compressor in the first predetermined period is larger than or equal to a first predetermined number of time threshold, the temperature control module adjusts the target refrigerant saturation temperature according to a predetermined step length.

In some embodiments, the operation parameters of the variable-frequency compressor include a working time and a working frequency or a working current of the variable-frequency compressor.

In some embodiments, when the working time of the variable-frequency compressor is larger than or equal to a second time threshold, the temperature control module obtains a current working frequency or a current working current of the variable-frequency compressor and a working frequency or a working current of the variable-frequency compressor before a second predetermined period; when the current working frequency is less than the working frequency before the second predetermined period or the current working current is less than the working current before the second predetermined period, the temperature control module keeps the target refrigerant saturation temperature unchanged; when the current working frequency is larger than or equal to the working frequency before the second predetermined period or the current working current is larger than or equal to the working current before the second predetermined period, the temperature control module adjusts the target refrigerant saturation temperature according to a predetermined step length.

In some embodiments, the operation parameters of the variable-frequency compressor include a working time of the variable-frequency compressor and a stop-start number of time of the variable-frequency compressor in a third predetermined period, in which when the working time of the variable-frequency compressor is larger than or equal to a third time threshold, and the stop-start number of time of the variable-frequency compressor in the first predetermined period is larger than or equal to a second predetermined number of time threshold, and the target refrigerant saturation temperature is larger than or equal to a predetermined saturation temperature threshold, the temperature control module adjusts the target refrigerant saturation temperature according to a predetermined step length.

In some embodiments, the operation parameters of the variable-frequency compressor include a working time and a working frequency or a working current of the variable-frequency compressor, in which when the working time of the variable-frequency compressor is larger than or equal to a fourth time threshold, and a current working frequency of the variable-frequency compressor is larger than or equal to a predetermined frequency threshold or a current working current of the variable-frequency compressor is larger than or equal to a predetermined current threshold, the temperature control module adjusts the target refrigerant saturation temperature according to a predetermined step length.

In some embodiments, the operation parameters of the variable-frequency compressor comprise a working time of the variable-frequency compressor, in which when the working time of the variable-frequency compressor is larger than a fifth time threshold and the variable-frequency compressor has not stopped, the temperature control module adjusts the target refrigerant saturation temperature according to a predetermined step length.

In some embodiments, when the working mode is the heating mode, the temperature control module reduces the target refrigerant saturation temperature by the predetermined step length and returns the working time of the variable-frequency compressor to zero; when the working mode is the refrigerating mode, the temperature control module increases the target refrigerant saturation temperature by the predetermined step length and returns the working time of the variable-frequency compressor to zero.

Additional aspects and advantages of embodiments of present invention will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present invention will become apparent and more readily appreciated from the following descriptions made with reference to the accompanying drawings, in which.

DETAILED DESCRIPTION

Figure 1A:
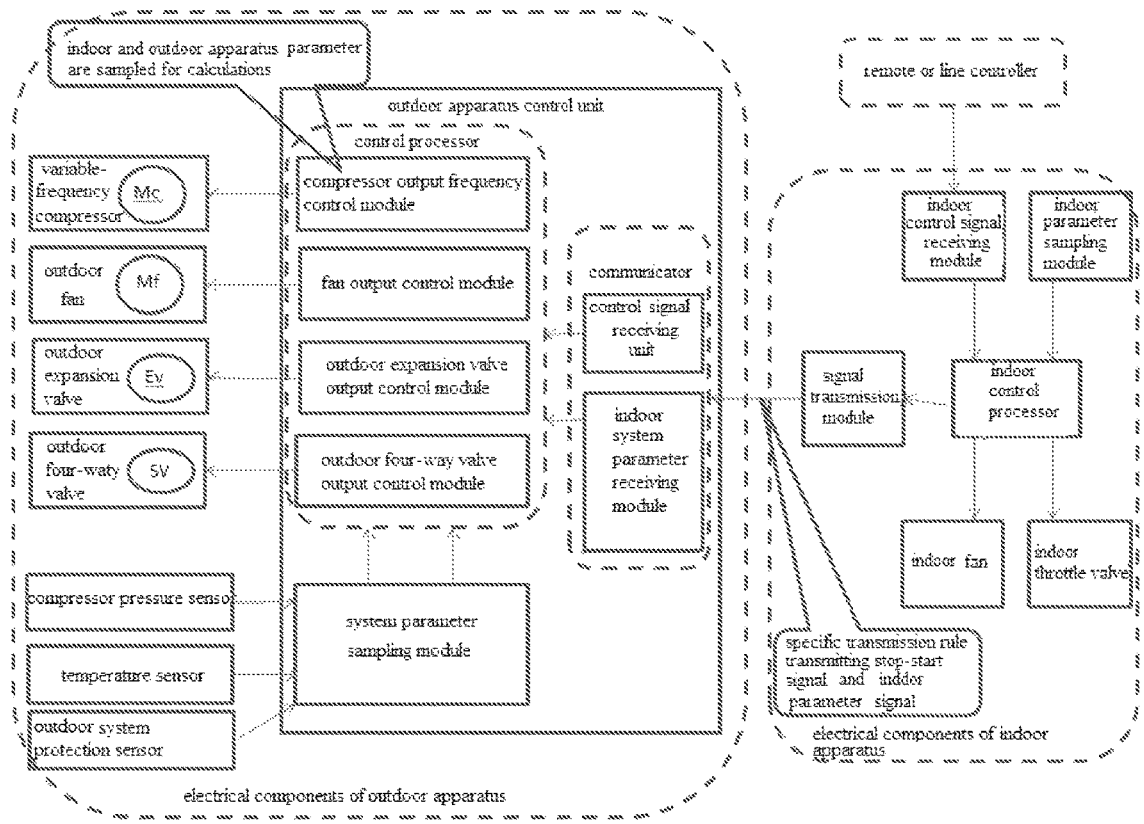
FIG. 1A is a schematic diagram of a variable-frequency air conditioning system in the prior art.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

The following description provides a plurality of embodiments or examples configured to achieve different structures of the present disclosure. In order to simplify the publishment of the present disclosure, components and dispositions of the particular embodiment are described in the following, which are only explanatory and not construed to limit the present disclosure. In addition, the present disclosure may repeat the reference number and/or letter in different embodiments for the purpose of simplicity and clarity, and the repeat does not indicate the relationship of the plurality of embodiments and/or dispositions. Moreover, in description of the embodiments, the structure of the second characteristic "above" the first characteristic may include an embodiment formed by the first and second characteristic contacted directly, and also may include another embodiment formed between the first and the second characteristic, in which the first characteristic and the second characteristic may not contact directly.

In addition, terms such as "first" and "second" are used herein for purposes of description and are not intended to indicate or imply relative importance or significance. Therefore, a "first" or "second" feature may explicitly or implicitly comprise one or more features. Further, in the description, unless indicated otherwise, "a plurality of" refers to two or more.

An air conditioning system according to embodiments of the present invention will be described in the following with reference to drawings.

Figure 1B:
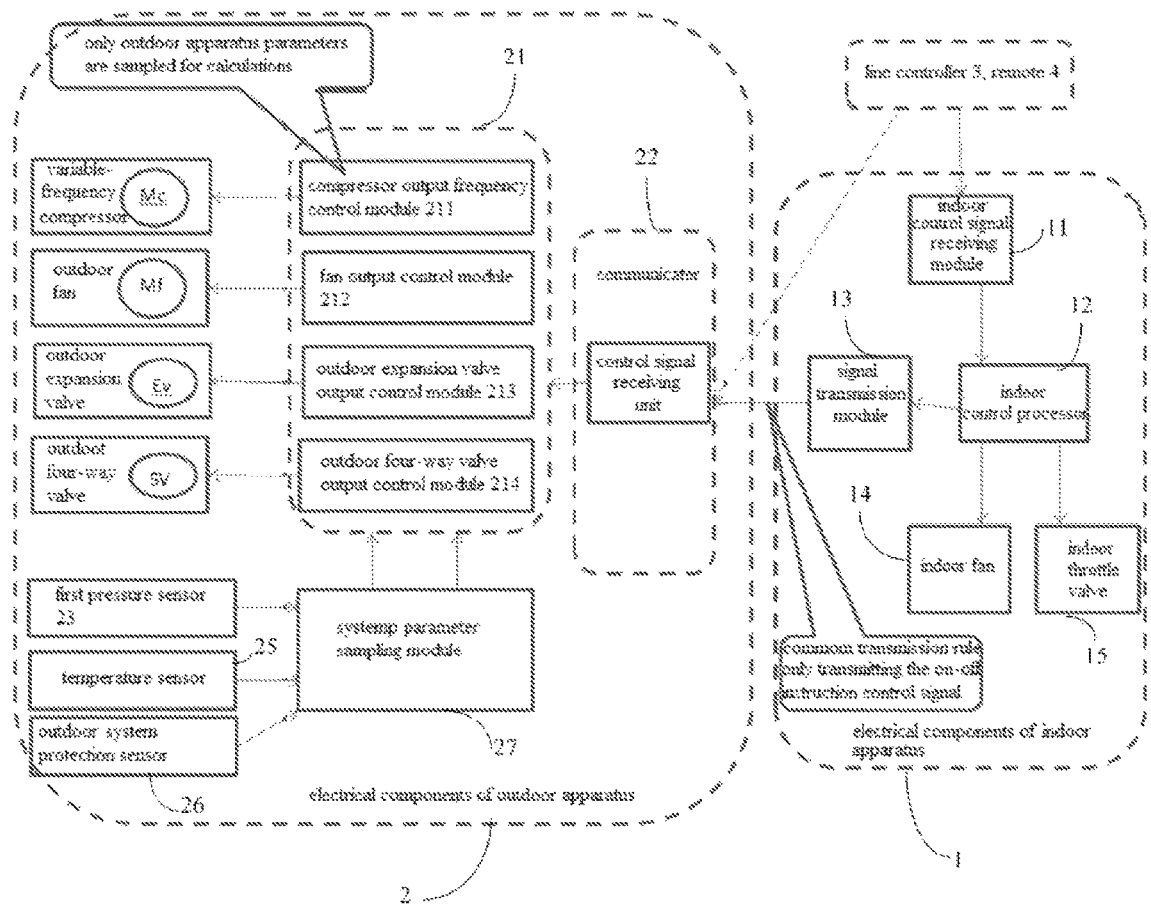
FIG. 1B is a schematic diagram of a variable-frequency air conditioning system according to an embodiment of the present invention.

FIG. 1B is a schematic diagram of the air conditioning system according to an embodiment of the present invention. As shown in FIG. 1B, the air conditioning system includes an indoor apparatus 1 and an outdoor apparatus 2.

The outdoor apparatus 2 includes a variable-frequency compressor Mc and a controller 21, and the controller 21 performs a variable-frequency control on the variable-frequency compressor Mc according to operation parameters of the variable-frequency compressor Mc and independent from the indoor apparatus 1.

Moreover, the outdoor apparatus 2 further includes a communicator 22 configured to receive an on-off instruction and a mode option instruction sent from a remote 3 and a line controller 4 directly or from the indoor apparatus 1. The controller 21 performs the variable-frequency control on the variable-frequency compressor Mc according to the operation parameters of the variable-frequency compressor Mc and a working mode corresponding to the mode option instruction. Specifically, as shown in FIG. 1B, the communicator 22 is a signal receiving module having a control signal receiving unit, and a control signal indicating the on-off instruction and a control signal indicating the mode option instruction sent from the remote 3 and the line controller 4 directly or from the indoor apparatus 1 are received only by the control signal receiving unit.

As shown in FIG. 1B, the indoor apparatus 1 includes an indoor control signal receiving module 11, an indoor control processor 12, a signal transmission module 13, an indoor fan 14 and an indoor throttle valve 15. The indoor fan 14 and the indoor throttle valve 15 are controlled by the indoor control processor 12, and the indoor apparatus 1 sends the control signal indicating the on-off instruction and the control signal indicating the mode option instruction to the control signal receiving unit in the communicator 22 via the signal transmission module 13 with general transmission rules. The control signal indicating the on-off instruction and the control signal indicating the mode option instruction can be sent to the communicator 22 in the outdoor apparatus 2 from the indoor apparatus 1 directly. Or, the control signal indicating the on-off instruction and the control signal indicating the mode option instruction sent from the remote 3 and the line controller 4 are received by the indoor control signal receiving module 11, and then the control signal indicating the on-off instruction and the control signal indicating the mode option instruction are transmitted to the control signal receiving unit in the communicator 22 by the signal transmission module 13 with general transmission rules.

In embodiments of the present invention, the air conditioning system controls a start or stop and the mode option of the outdoor apparatus according to the control signal indicating the on-off instruction and the control signal indicating the mode option instruction.

As shown in FIG. 1B, the outdoor apparatus 2 further includes a first pressure sensor 23 disposed at an inlet of the variable-frequency compressor Mc, and the first pressure sensor 23 is configured to generate a first pressure detecting signal when a working mode of the air conditioning system is a refrigerating mode. When the air conditioning system only has a refrigerating function, the first pressure sensor 23 is required to be disposed at a return-air pipe of the variable-frequency compressor Mc to detect a pressure at a return-air low pressure side of the variable-frequency compressor Mc when the air conditioning system is in the refrigerating mode.

Figure 2:
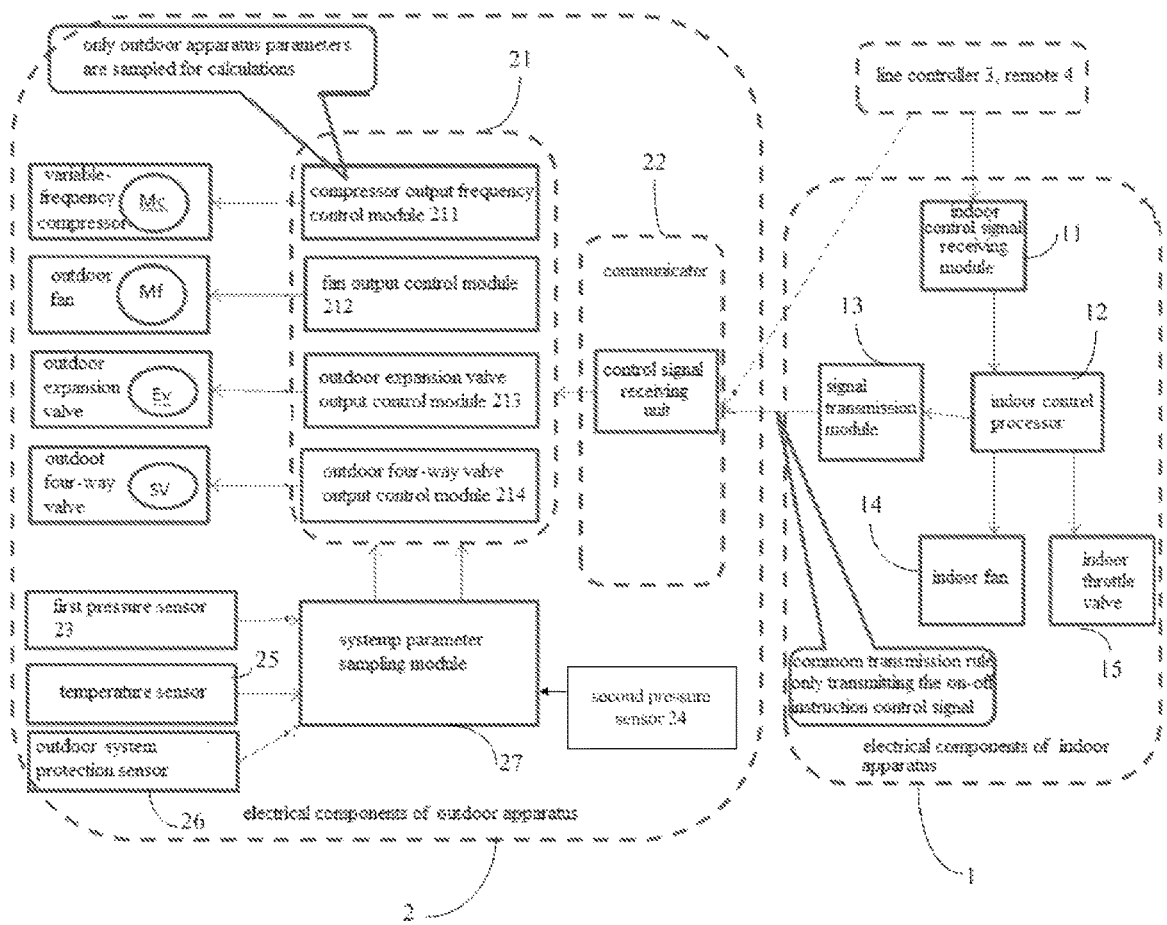
FIG. 2 is a schematic diagram of a variable-frequency air conditioning system according to another embodiment of the present invention.

In an embodiment of the present invention, as shown in FIG. 2, the outdoor apparatus 2 further includes a second pressure sensor 24 disposed at an outlet of the variable-frequency compressor Mc, and the second pressure sensor 24 is configured to generate a second pressure detecting signal when the working mode is a heating mode. In other words, when the air conditioning system is a refrigerating and heating air condition, the second pressure sensor 24 is further required to be disposed at an exhaust pipe of the variable-frequency compressor Mc to detect a pressure at an exhaust high pressure side when the air conditioning system is in the heating mode. Alternatively, a pressure sensor may be disposed in rear of a four-way value, such that when the air conditioning system is in the refrigerating mode, a pressure detected by the pressure sensor is a pressure at the low pressure side which is generally equal to the pressure at the return-air low pressure side and when the air conditioning system is in the heating mode, the pressure detected by the pressure sensor is a pressure at the high pressure side which is generally equal to the pressure at the exhaust high pressure side.

The controller 21 selects one of the first pressure detecting signal and the second pressure detecting signal to generate a current refrigerant saturation temperature according to the working mode of the air conditioning system, and obtains a target refrigerant saturation temperature. Moreover, the controller 21 performs a variable-frequency control on the compressor Mc according to the current refrigerant saturation temperature and the target refrigerant saturation temperature. During the variable-frequency control for the variable-frequency compressor Mc, the controller 21 adjusts the target refrigerant saturation temperature according to the operation parameters of the variable-frequency compressor Mc. In embodiments of the present invention, the controller 21 sets an adjusted target refrigerant saturation temperature as the refrigerant saturation temperature of the outdoor apparatus 2 in a next start, when the outdoor apparatus 2 is stopped.

As show in FIG. 1B or FIG. 2, the outdoor apparatus 2 further includes a temperature sensor 25. The temperature sensor 25 is configured to detect a current ambient temperature of the outdoor apparatus 2. If the outdoor apparatus 2 is started for a first time in a predetermined working cycle, the controller 21 determines the target refrigerant saturation temperature according to the current ambient temperature of the outdoor apparatus 2. It should be noted that, the predetermined working cycle should be understood broadly and may be several years or several months. For example, the outdoor apparatus 2 is stopped in summer and is re-started in winter. When the outdoor apparatus 2 is started for the first time in winter, the controller 21 determines the target refrigerant saturation temperature according to the current ambient temperature of the outdoor apparatus 2, instead of using the adjusted target refrigerant saturation temperature recorded at a last stop (i.e., in summer several months ago).

In addition, as shown in FIG. 1B or FIG. 2, the outdoor apparatus 2 further includes an outdoor fan Mf, an outdoor expansion valve Ev, an outdoor four-way valve SV and an outdoor system protection sensor 26, a system parameter sampling module 27 connected between respective sensor and the controller 21 and configured to process parameters sampled by the first pressure sensor 23, the second pressure sensor 24, the temperature sensor 25 and the outdoor system protection sensor 26 and to send the sampled parameters to the controller 21. The controller 21 includes a compressor output frequency control module 211, a fan output control module 212, an outdoor expansion valve output control module 213 and an outdoor four-way valve output control module 214 which control the variable-frequency compressor Mc, the outdoor fan Mf, the outdoor expansion valve Ev and the outdoor four-way valve SV respectively according to sampled signals from the system parameter sampling module 27.

In an embodiment of the present invention, the operation parameters of the variable-frequency compressor Mc include a working time of the variable-frequency compressor Mc and a stop-start number of time in a first predetermined period. When the working time of the variable-frequency compressor is larger than or equal to a first time threshold and the stop-start number of time of the variable-frequency compressor in the first predetermined period is larger than or equal to a first predetermined number of time threshold, the controller 21 adjusts the target refrigerant saturation temperature according to a predetermined step length.

Specifically, a control process of the air conditioning system will be described in following two embodiments of the heating mode and the refrigerating mode respective.

Embodiment 1

Figure 3:
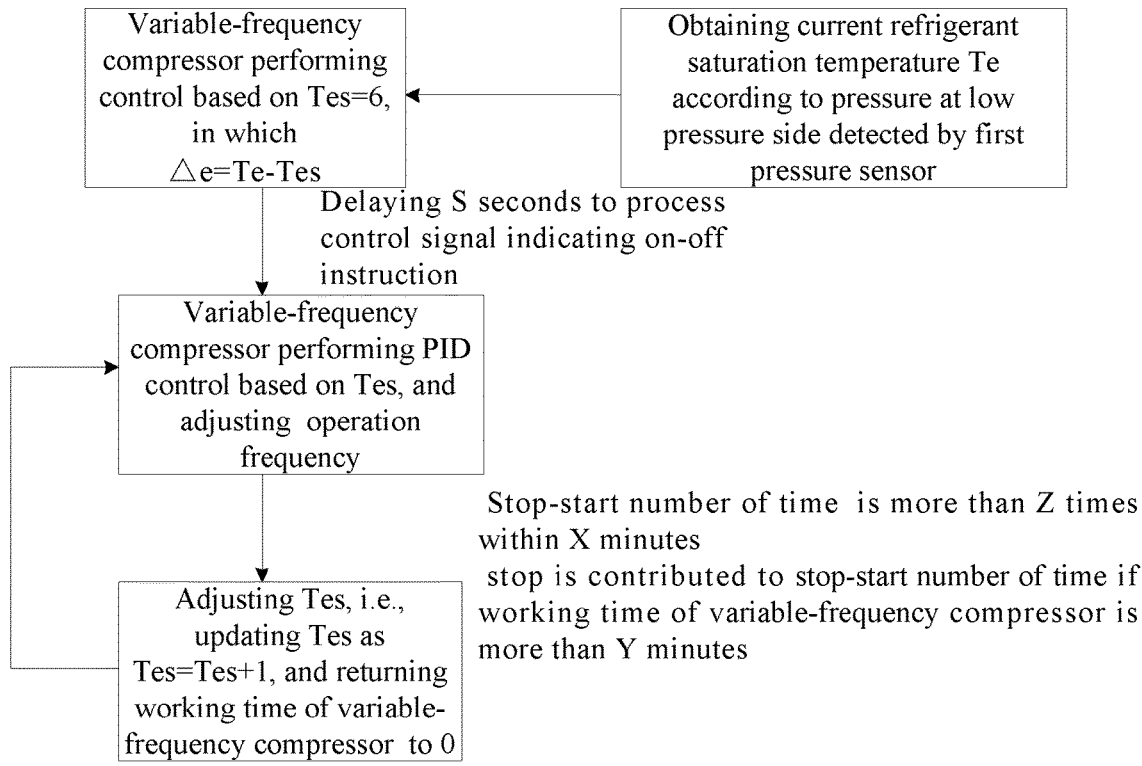
FIG. 3 is a flow chart showing a control logic of an air conditioning system according to a first embodiment of the present invention.

As shown in FIG. 3, in the refrigerating mode, the first pressure sensor 23 configured to detect the pressure at the low pressure side is disposed in the outdoor apparatus 2. The outdoor apparatus 2 starts or stops a refrigerating system according to the control signal indicating the mode option instruction and the control signal indicating the on-off instruction. The controller 21 delays a predetermined period (such as S seconds) to start or stop after receiving the control signal indicating the on-off instruction, so as to prevent the controller 21 from executing incorrect instruction caused by misoperation, i.e., the controller 21 delays the predetermined period (such as S seconds) to start or stop after receiving the on-off instruction.

Moreover, if the indoor apparatus 1 is started for the first time in the predetermined working cycle, the controller 21 determines the target refrigerant saturation temperature Tes according to the current ambient temperature of the outdoor apparatus 2. For example, when the current ambient temperature of the outdoor apparatus 2 is between 30° C. and 35° C., an initial target refrigerant saturation temperature may be set as 6° C.; when the current ambient temperature of the outdoor apparatus 2 is between 35° C. and 40° C., the initial target refrigerant saturation temperature may be set as 3° C.; when the current ambient temperature of the outdoor apparatus 2 is between 25° C. and 30° C., the initial target refrigerant saturation temperature may be set as 8° C. When the indoor apparatus 1 is not started for the first time in the predetermined working cycle, the recorded adjusted target refrigerant saturation temperature in a last stop is set as the initial target refrigerant saturation temperature of the outdoor apparatus 2 in a current start.

Subsequently, the controller 21 generates the current refrigerant saturation temperature Te according to the first pressure detecting signal generated by the first pressure sensor 23. And then the controller 21 performs a PID (Proportion Integration Differentiation) adjustment on the current refrigerant saturation temperature Te according to the target refrigerant saturation temperature Tes. The PID adjustment is illustrated as follows.

A difference between the current refrigerant saturation temperature Te and the target refrigerant saturation temperature Tes is denoted as $\Delta e = Te-Tes$. For example, the current refrigerant saturation temperature Te is 10, the target refrigerant saturation temperature Tes is 6, and then a current difference is denoted as $\Delta e0 = 10-6 = 4$. Since sampled data are discrete, according to a difference value of a previous $\Delta e1$ (i.e., a difference of a certain period (such as 40 s) ago) and a current $\Delta e0$ or a weighted value of the previous $\Delta e1$ and the current $\Delta e0$, feedback quantities of $\Delta e0$ and $\Delta e1$ can be determined to perform the PID adjustment so as to obtain an operation frequency variation of the variable-frequency compressor. A rotating speed of the variable-frequency compressor is equal to a sum of a current rotating speed and a rotating speed variation, and the rotating speed variation of the variable-frequency compressor is represented as $(K_p + K_i/s + K_d*s)*E(\Delta e1, \Delta e0)$, where $K_p$, $K_i$, $s$, $K_d$ are predetermined constants, and $\Delta e1$, $\Delta e0$ are real-time feedback quantities.

In the embodiment of the present invention, when the outdoor apparatus 2 is stopped, the controller 21 determines a working time of the variable-frequency compressor Mc. If the working time of the variable-frequency compressor Mc is less than a first time threshold (such as Y minutes), this stop of the outdoor apparatus 2 is not contributed to the stop-start number of time according to which the controller 21 adjusts the target refrigerant saturation temperature, so as to prevent the controller 21 from executing incorrect instructions caused by misoperation.

If the working time of the variable-frequency compressor Mc is larger than or equal to the first time threshold (such as Y minutes), this stop of the outdoor apparatus 2 is contributed to the stop-start number of time according to which the controller 21 adjusts the target refrigerant saturation temperature. Moreover, when the stop-start number of time of the variable-frequency compressor within a first predetermined period (such as X minutes) is larger than or equal to a first predetermined number of time threshold (such as Z times), a refrigerating load of the indoor apparatus 1 is determined as relatively smaller and the controller 21 adjusts the target refrigerant saturation temperature Tes according to the predetermined step length, that is, the controller 21 keeps revising the target refrigerant saturation temperature Tes upwards, for example the current refrigerant saturation temperature Tes is updated as Tes=Tes+1. Simultaneously, the working time of the variable-frequency compressor Mc returns to 0 and is retimed from this moment, and an updated target refrigerant saturation temperature Tes is used to perform the PID adjustment on the current refrigerant saturation temperature Te constantly. And thus the variable-frequency compressor may lower its rotating speed so as to reduce a refrigerating capacity, such that an indoor temperature is decreased slowly and a frequent stop of the outdoor apparatus 2 is reduced. Simultaneously, the current target refrigerant saturation temperature is recorded as the initial target refrigerant saturation temperature of the next start.

Thus, the air conditioning system according to embodiments of the present invention makes an identification and determination according to influence of indoor loads on operation parameters of the refrigerating system so as to adjust the operation frequency of the variable-frequency compressor intelligently.

Embodiment 2

Figure 4:
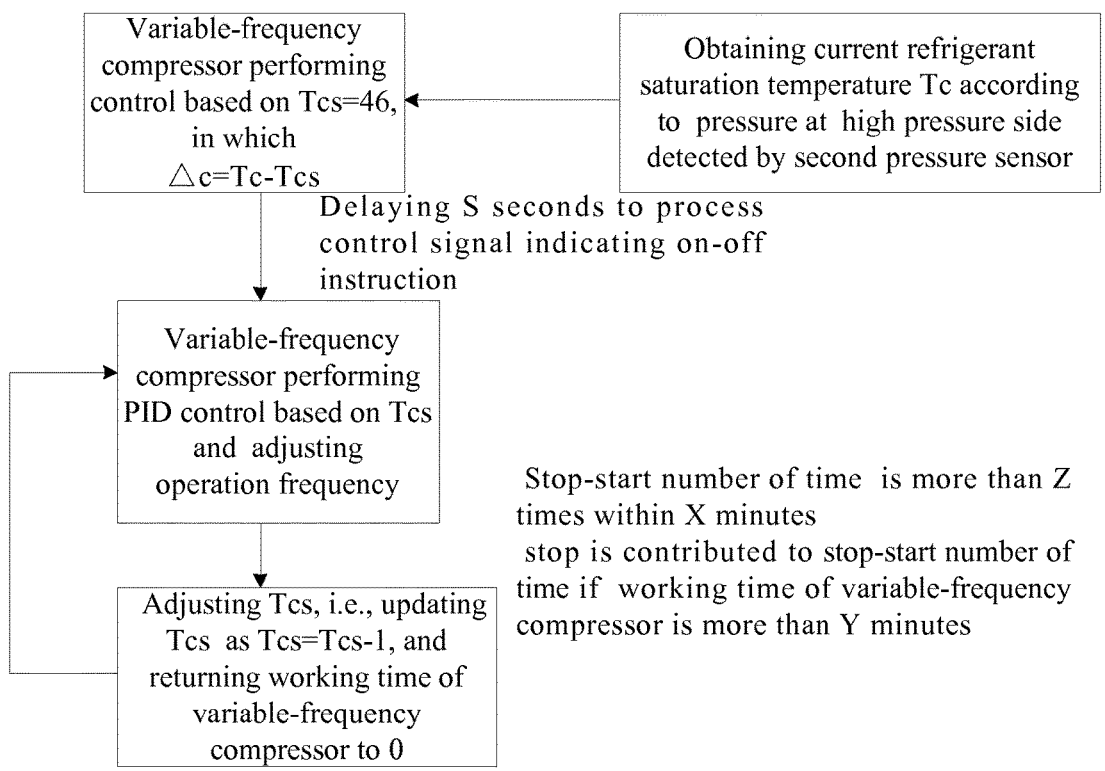
FIG. 4 is a flow chart showing a control logic of an air conditioning system according to a second embodiment of the present invention.

As shown in FIG. 4, in the heating mode, the second pressure sensor 24 configured to detect the pressure at the high pressure side is disposed in the outdoor apparatus 2. The outdoor apparatus 2 starts or stops a heating system according to the control signal indicating the mode option instruction and the control signal indicating the on-off instruction. The controller 21 delays a second predetermined period (such as S seconds) to start or stop after receiving the control signal indicating the on-off instruction, so as to prevent the controller 21 from executing incorrect instruction caused by misoperation.

Moreover, if the indoor apparatus 1 is started for the first time in the predetermined working cycle, the controller 21 determines the target refrigerant saturation temperature Tcs according to the current ambient temperature of the outdoor apparatus 2. For example, when the current ambient temperature of the outdoor apparatus 2 is between 7° C. and 10° C., the initial target refrigerant saturation temperature is determined as 46° C. When the indoor apparatus 1 is not started for the first time in the predetermined working cycle, the recorded adjusted target refrigerant saturation temperature in the last stop is set as the initial target refrigerant saturation temperature of the outdoor apparatus 2 in the current start.

Subsequently, the controller 21 generates the current refrigerant saturation temperature Tc according to the second pressure detecting signal generated by the second pressure sensor 24. And then the controller 21 performs the PID adjustment on the current refrigerant saturation temperature Tc according to the target refrigerant saturation temperature Tcs.

In the embodiment of the present invention, when the outdoor apparatus 2 is stopped, the controller 21 determines the working time of the variable-frequency compressor Mc. If the working time of the variable-frequency compressor Mc is less than the first time threshold (such as Y minutes), this stop of the outdoor apparatus 2 is not contributed to the stop-start number of time according to which the controller 21 adjusts the target refrigerant saturation temperature, so as to prevent the controller 21 from executing incorrect instruction caused by misoperation.

If the working time of the variable-frequency compressor Mc is larger than or equal to the first time threshold (such as Y minutes), this stop of the outdoor apparatus 2 is contributed to the stop-start number of time according to which the controller 21 adjusts the target refrigerant saturation temperature. Moreover, when the stop-start number of time of the variable-frequency compressor within a first predetermined period (such as X minutes) is larger than or equal to a first predetermined number of time threshold (such as Z times), a heating load of the indoor apparatus 1 is determined as relatively smaller and the controller 21 adjusts the target refrigerant saturation temperature Tcs according to the predetermined step length, that is, the controller 21 keeps revising the target refrigerant saturation temperature Tcs downwards, for example the current refrigerant saturation temperature Tcs is updated as Tcs=Tcs−1. Simultaneously, the working time of the variable-frequency compressor Mc returns to 0 and is retimed from this moment, and an updated target refrigerant saturation temperature Tcs is used to perform the PID adjustment on the current refrigerant saturation temperature Tc constantly. And thus the variable-frequency compressor may lower its rotating speed so as to reduce a refrigerating capacity, such that an indoor temperature is decreased slowly and a frequent stop of the outdoor apparatus 2 is reduced. Simultaneously, the current target refrigerant saturation temperature is recorded as the initial target refrigerant saturation temperature of the next start.

Thus, the air conditioning system according to embodiments of the present invention makes an identification and determination according to influence of indoor loads on operation parameters of the refrigerating system so as to adjust the operation frequency of the variable-frequency compressor intelligently.

In another embodiment of the present invention, the operation parameters of the variable-frequency compressor include a working time and a working frequency or a working current of the variable-frequency compressor. When the working time of the variable-frequency compressor is larger than or equal to a second time threshold, the controller obtains a current working frequency or a current working current of the variable-frequency compressor and a working frequency or a working current before of the variable-frequency compressor before a second predetermined period; when the current working frequency is less than the working frequency before the second predetermined period or the current working current is less than the working current before the second predetermined period, the controller keeps the target refrigerant saturation temperature unchanged; when the current working frequency is larger than or equal to the working frequency before the second predetermined period or the current working current is larger than or equal to the working current the second predetermined period, the controller adjusts the target refrigerant saturation temperature according to a predetermined step length.

Specifically, a control process of the air conditioning system will be described in following two embodiments of the heating mode and the refrigerating mode respective.

Embodiment 3

Figure 5:
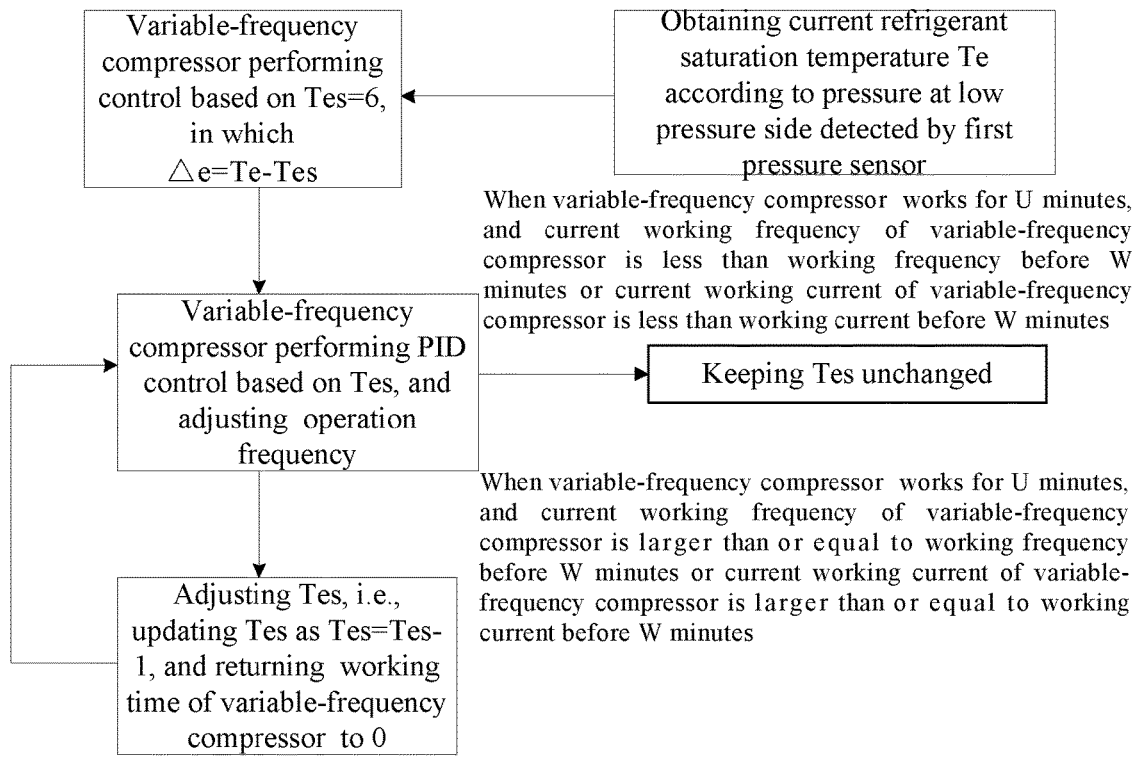
FIG. 5 is a flow chart showing a control logic of an air conditioning system according to a third embodiment of the present invention.

As shown in FIG. 5, in the refrigerating mode, the first pressure sensor 23 configured to detect the pressure at the low pressure side is disposed in the outdoor apparatus 2. The outdoor apparatus 2 operates to refrigerate according to the control signal indicating the mode option instruction and the control signal indicating the on-off instruction.

Moreover, if the indoor apparatus 1 is started for the first time in the predetermined working cycle, the controller 21 determines the target refrigerant saturation temperature Tes according to the current ambient temperature of the outdoor apparatus 2. For example, when the current ambient temperature of the outdoor apparatus 2 is between 30° C. and 35° C., an initial target refrigerant saturation temperature may be set as 6° C.; when the current ambient temperature of the outdoor apparatus 2 is between 35° C. and 40° C., the initial target refrigerant saturation temperature may be set as 3° C.; when the current ambient temperature of the outdoor apparatus 2 is between 25° C. and 30° C., the initial target refrigerant saturation temperature may be set as 8° C. When the indoor apparatus 1 is not started for the first time in the predetermined working cycle, the recorded adjusted target refrigerant saturation temperature in a last stop is set as the initial target refrigerant saturation temperature of the outdoor apparatus 2 in a current start.

Subsequently, the controller 21 generates the current refrigerant saturation temperature Te according to the first pressure detecting signal generated by the first pressure sensor 23. And then the controller 21 performs a PID (Proportion Integration Differentiation) adjustment on the current refrigerant saturation temperature Te according to the target refrigerant saturation temperature Tes. The PID adjustment is illustrated as follows.

A difference between the current refrigerant saturation temperature Te and the target refrigerant saturation temperature Tes is denoted as $\Delta e=Te-Tes$. For example, the current refrigerant saturation temperature Te is 10, the target refrigerant saturation temperature Tes is 6, and then a current difference is denoted as $\Delta e0=10-6=4$. Since sampled data are discrete, according to a difference value of a previous $\Delta e1$ (i.e., a difference of a certain period (such as 40 s) ago) and a current $\Delta e0$ or a weighted value of the previous $\Delta e1$ and the current $\Delta e0$, feedback quantities of $\Delta e0$ and $\Delta e1$ can be determined to perform the PID adjustment so as to obtain an operation frequency variation of the variable-frequency compressor. A rotating speed of the variable-frequency compressor is equal to a sum of a current rotating speed and a rotating speed variation, and the rotating speed variation of the variable-frequency compressor is represented as $(Kp+Ki/s+Kd*s)*E(\Delta e1, \Delta e0)$, where Kp, Ki, s, Kd are predetermined constants, and $\Delta e1$, $\Delta e0$ are real-time feedback quantities.

In the embodiment of the present invention, when the working time of the variable-frequency compressor Mc is larger than or equal to a second time threshold (such as U minutes), the controller compares a current working frequency of the variable-frequency compressor with a working frequency of the variable-frequency compressor before a second predetermined period (such as W minutes) to determine whether it is needed to adjust the target refrigerant saturation temperature Tes, or the controller compares a current working current of the variable-frequency compressor with a working current of the variable-frequency compressor before the second predetermined period (such as W minutes) to determine whether it is needed to adjust the target refrigerant saturation temperature Tes.

When the variable-frequency compressor Mc works for U minutes, and the current working frequency of the variable-frequency compressor Mc is less than the working frequency before the second predetermined period (such as W minutes) or the current working current of variable-frequency compressor Mc is less than the working current before the second predetermined period (such as W minutes) and the variable-frequency compressor Mc has not stopped, the controller determines not to adjust the target refrigerant saturation temperature Tes and thus the variable-frequency compressor Mc keeps operating under a current PID control requirement, such that an indoor temperature can reach a predetermined target gradually. Also, the current target refrigerant saturation temperature Tes is recorded as an initial target refrigerant saturation temperature of a next start.

When the variable-frequency compressor Mc works for U minutes, and the current working frequency of the variable-frequency compressor Mc is larger than or equal to the working frequency before the second predetermined period (such as W minutes) or the current working current of variable-frequency compressor Mc is larger than or equal to the working current before the second predetermined period (such as W minutes), and the variable-frequency compressor Mc has not stopped, a capability of the variable-frequency compressor Mc may be regarded as not enough to carry a desired refrigerating load, and thus the controller 21 adjusts the target refrigerant saturation temperature Tes according to the predetermined step length, that is, the controller 21 keeps revising the target refrigerant saturation temperature Tes downwards, for example the current refrigerant saturation temperature Tes is updated as Tes=Tes−1. Simultaneously, the working time of the variable-frequency compressor Mc returns to 0 and is retimed from this moment, and an updated target refrigerant saturation temperature Tes is used to perform the PID adjustment on the current refrigerant saturation temperature Te constantly. Thereby, a rotating speed of the variable-frequency compressor is increased and a suction pressure of the variable-frequency compressor is decreased, such that an indoor temperature can reach a predetermined target. Simultaneously, the current target refrigerant saturation temperature is recorded as the initial target refrigerant saturation temperature of the next start.

Thus, the air conditioning system according to embodiments of the present invention makes an identification and determination according to influence of indoor loads on operation parameters of the refrigerating system so as to adjust the operation frequency of the variable-frequency compressor intelligently.

Embodiment 4

Figure 6:
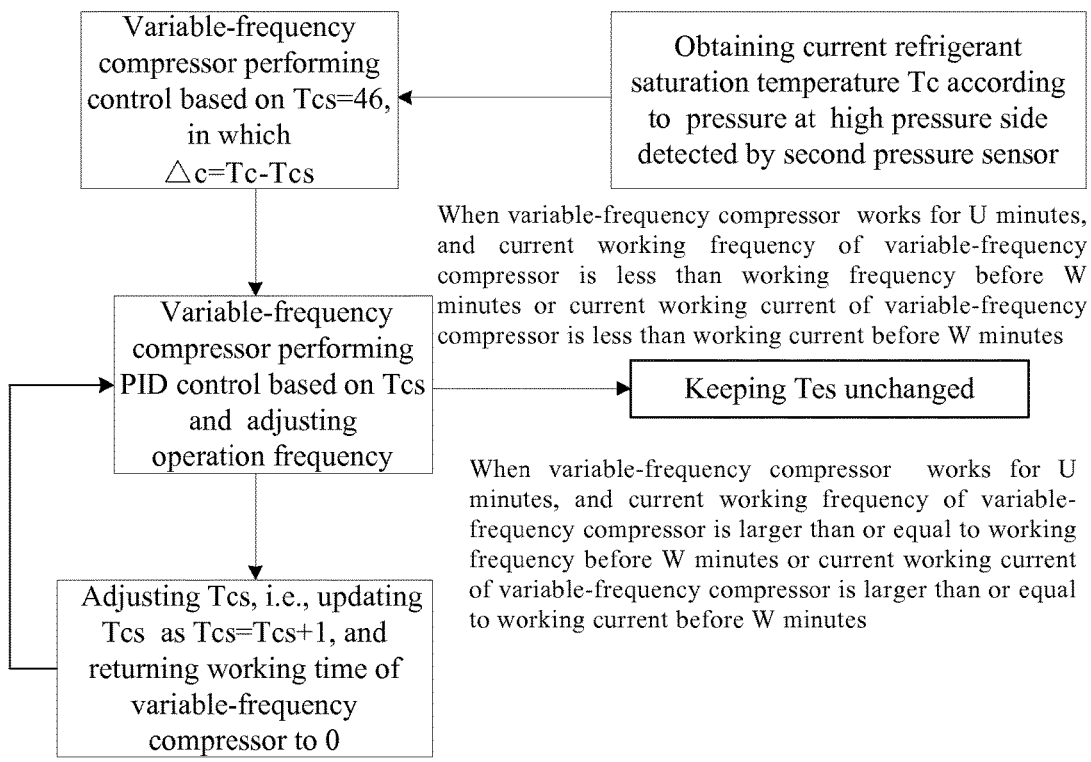
FIG. 6 is a flow chart showing a control logic of an air conditioning system according to a fourth embodiment of the present invention.

As shown in FIG. 6, in the heating mode, the second pressure sensor 24 configured to detect the pressure at the high pressure side is disposed in the outdoor apparatus 2. The outdoor apparatus 2 operates to heat according to the control signal indicating the mode option instruction and the control signal indicating the on-off instruction.

Moreover, if the indoor apparatus 1 is started for the first time in the predetermined working cycle, the controller 21 determines the target refrigerant saturation temperature Tcs according to the current ambient temperature of the outdoor apparatus 2. For example, when the current ambient temperature of the outdoor apparatus 2 is between 7° C. and 10° C., the initial target refrigerant saturation temperature is determined as 46° C. When the indoor apparatus 1 is not started for the first time in the predetermined working cycle, the recorded adjusted target refrigerant saturation temperature in the last stop is set as the initial target refrigerant saturation temperature of the outdoor apparatus 2 in the current start.

Subsequently, the controller 21 generates the current refrigerant saturation temperature Tc according to the second pressure detecting signal generated by the second pressure sensor 24. And then the controller 21 performs the PID adjustment on the current refrigerant saturation temperature Tc according to the target refrigerant saturation temperature Tcs.

In the embodiment of the present invention, when the working time of the variable-frequency compressor Mc is larger than or equal to a second time threshold (such as U minutes), the controller compares a current working frequency of the variable-frequency compressor with a working frequency of the variable-frequency compressor before a second predetermined period (such as W minutes) to determine whether it is needed to adjust the target refrigerant saturation temperature Tcs, or the controller compares a current working current of the variable-frequency compressor with a working current of the variable-frequency compressor before the second predetermined period (such as W minutes) to determine whether it is needed to adjust the target refrigerant saturation temperature Tcs.

When the variable-frequency compressor Mc works for U minutes, and the current working frequency of the variable-frequency compressor Mc is less than the working frequency before the second predetermined period (such as W minutes) or the current working current of variable-frequency compressor Mc is less than the working current before the second predetermined period (such as W minutes), and the variable-frequency compressor Mc has not stopped, the controller determines not to adjust the target refrigerant saturation temperature Tcs and thus the variable-frequency compressor Mc keeps operating under a current PID control requirement, such that an indoor temperature can reach a predetermined target gradually. Also, the current target refrigerant saturation temperature Tcs is recorded as an initial target refrigerant saturation temperature of a next start.

When the variable-frequency compressor Mc works for U minutes, and the current working frequency of the variable-frequency compressor Mc is larger than or equal to the working frequency before the second predetermined period (such as W minutes) or the current working current of variable-frequency compressor Mc is larger than or equal to the working current before the second predetermined period (such as W minutes), and the variable-frequency compressor Mc has not stopped, a capability of the variable-frequency compressor Mc may be regarded as not enough to carry a desired heating load, and thus the controller 21 adjusts the target refrigerant saturation temperature Tcs according to the predetermined step length, that is, the controller 21 keeps revising the target refrigerant saturation temperature Tcs upwards, for example the current refrigerant saturation temperature Tcs is updated as Tcs=Tcs+1. Simultaneously, the working time of the variable-frequency compressor Mc returns to 0 and is retimed from this moment, and an updated target refrigerant saturation temperature Tcs is used to perform the PID adjustment on the current refrigerant saturation temperature Tc constantly. Thus, a rotating speed of the variable-frequency compressor is increased and a discharging pressure at the high pressure side is increased, such that an indoor temperature can reach a predetermined target. Simultaneously, the current target refrigerant saturation temperature is recorded as the initial target refrigerant saturation temperature of the next start.

Thus, the air conditioning system according to embodiments of the present invention makes an identification and determination according to influence of indoor loads on operation parameters of the refrigerating system so as to adjust the operation frequency of the variable-frequency compressor intelligently.

In an embodiment of the present invention, the operation parameters of the variable-frequency compressor include a working time of the variable-frequency compressor and a stop-start number of time of the variable-frequency compressor in a third predetermined period, in which when the working time of the variable-frequency compressor is larger than or equal to a third time threshold, and the stop-start number of time of the variable-frequency compressor in the third predetermined period is larger than or equal to a second predetermined number of time threshold, and the target refrigerant saturation temperature is larger than or equal to a predetermined saturation temperature threshold, the controller adjusts the target refrigerant saturation temperature according to a predetermined step length.

Specifically, a control process of the air conditioning system will be described in following two embodiments of the heating mode and the refrigerating mode respective.

Embodiment 5

Figure 7:
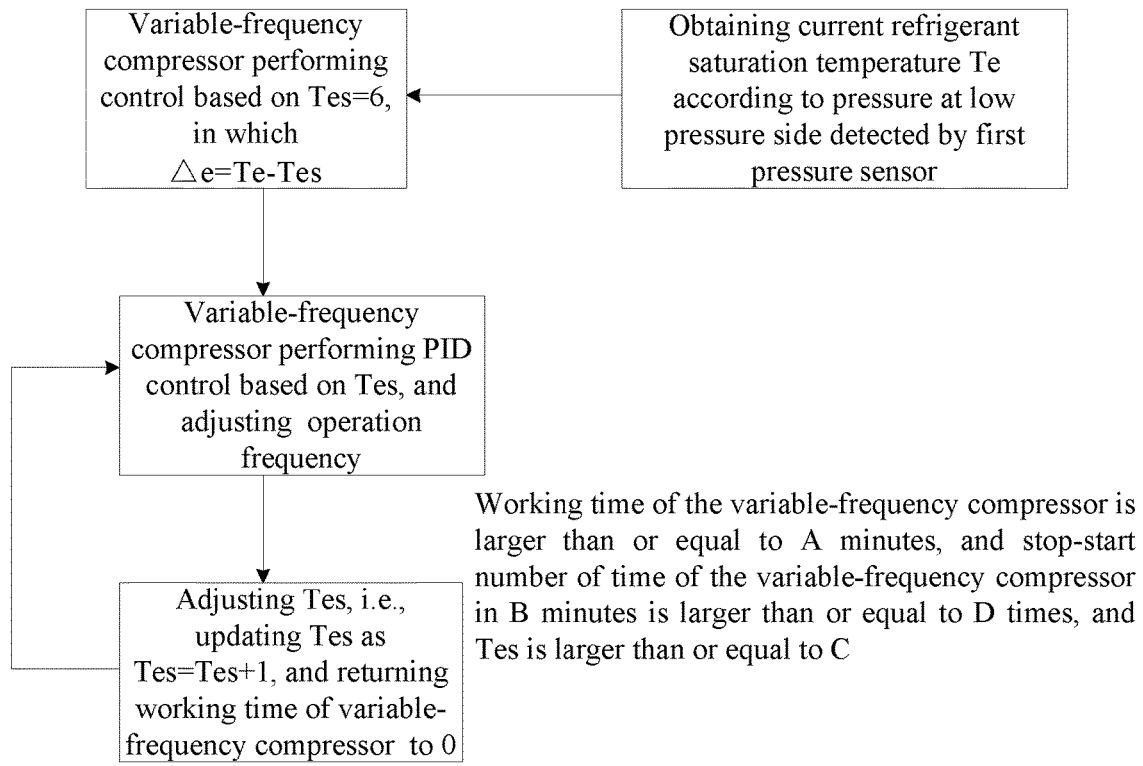
FIG. 7 is a flow chart showing a control logic of an air conditioning system according to a fifth embodiment of the present invention.

As shown in FIG. 7, in the refrigerating mode, the first pressure sensor 23 configured to detect the pressure at the low pressure side is disposed in the outdoor apparatus 2. The outdoor apparatus 2 operates to refrigerate according to the control signal indicating the mode option instruction and the control signal indicating the on-off instruction.

Moreover, if the indoor apparatus 1 is started for the first time in the predetermined working cycle, the controller 21 determines the target refrigerant saturation temperature Tes according to the current ambient temperature of the outdoor apparatus 2. For example, when the current ambient temperature of the outdoor apparatus 2 is between 30° C. and 35° C., an initial target refrigerant saturation temperature may be set as 6° C.; when the current ambient temperature of the outdoor apparatus 2 is between 35° C. and 40° C., the initial target refrigerant saturation temperature may be set as 3° C.; when the current ambient temperature of the outdoor apparatus 2 is between 25° C. and 30° C., the initial target refrigerant saturation temperature may be set as 8° C. When the indoor apparatus 1 is not started for the first time in the predetermined working cycle, the recorded adjusted target refrigerant saturation temperature in a last stop is set as the initial target refrigerant saturation temperature of the outdoor apparatus 2 in a current start.

Subsequently, the controller 21 generates the current refrigerant saturation temperature Te according to the first pressure detecting signal generated by the first pressure sensor 23. And then the controller 21 performs a PID (Proportion Integration Differentiation) adjustment on the current refrigerant saturation temperature Te according to the target refrigerant saturation temperature Tes. The PID adjustment is illustrated as follows.

A difference between the current refrigerant saturation temperature Te and the target refrigerant saturation temperature Tes is denoted as $\Delta e = Te - Tes$. For example, the current refrigerant saturation temperature Te is 10, the target refrigerant saturation temperature Tes is 6, and then a current difference is denoted as $\Delta e0=10-6=4$. Since sampled data are discrete, according to a difference value of a previous $\Delta e1$ (i.e., a difference of a certain period (such as 40 s) ago) and a current $\Delta e0$ or a weighted value of the previous $\Delta e1$ and the current $\Delta e0$, feedback quantities of $\Delta e0$ and $\Delta e1$ can be determined to perform the PID adjustment so as to obtain an operation frequency variation of the variable-frequency compressor. A rotating speed of the variable-frequency compressor is equal to a sum of a current rotating speed and a rotating speed variation, and the rotating speed variation of the variable-frequency compressor is represented as $(Kp+Ki/s+Kd*s)*E(\Delta e1, \Delta e0)$, where Kp, Ki, s, Kd are predetermined constants, and $\Delta e1$, $\Delta e0$ are real-time feedback quantities.

In the embodiment of the present invention, when the working time of the variable-frequency compressor Mc is larger than or equal to a third time threshold (such as A minutes), the controller determines whether to adjust the target refrigerant saturation temperature Tes according to the received stop-start number of time of the variable-frequency compressor and an indoor capability requirement, i.e., the controller determines whether the stop-start number of time of the variable-frequency compressor in a third predetermined period (such as B minutes) is larger than or equal to a second predetermined number of time threshold (such as D times) and whether the target refrigerant saturation temperature Tes is larger than or equal to a predetermined saturation temperature threshold C, so as to determine whether it is needed to adjust the target refrigerant saturation temperature Tes.

In the embodiment of the present invention, when the working time of the variable-frequency compressor Mc is larger than or equal to the third time threshold (such as A minutes), the normally recorded stop-start number of time of the variable-frequency compressor in B minutes is larger than or equal to D times, and the target refrigerant saturation temperature Tes is larger than or equal to C, a refrigerating load of the indoor apparatus 1 is determined as relatively smaller and the controller 21 adjusts the target refrigerant saturation temperature Tes according to the predetermined step length, that is, the controller 21 keeps revising the target refrigerant saturation temperature Tes upwards, for example the current refrigerant saturation temperature Tes is updated as Tes=Tes+1. Simultaneously, the working time of the variable-frequency compressor Mc returns to 0 and is retimed from this moment, and an updated target refrigerant saturation temperature Tes is used to perform the PID adjustment on the current refrigerant saturation temperature Tc constantly. And thus the variable-frequency compressor may lower its rotating speed so as to reduce a refrigerating capacity, such that an indoor temperature is decreased slowly and a frequent stop of the outdoor apparatus 2 is reduced. Simultaneously, the current target refrigerant saturation temperature is recorded as the initial target refrigerant saturation temperature of the next start.

Thus, the air conditioning system according to embodiments of the present invention makes an identification and determination according to influence of indoor loads on operation parameters of the refrigerating system so as to adjust the operation frequency of the variable-frequency compressor intelligently.

Embodiment 6

Figure 8:
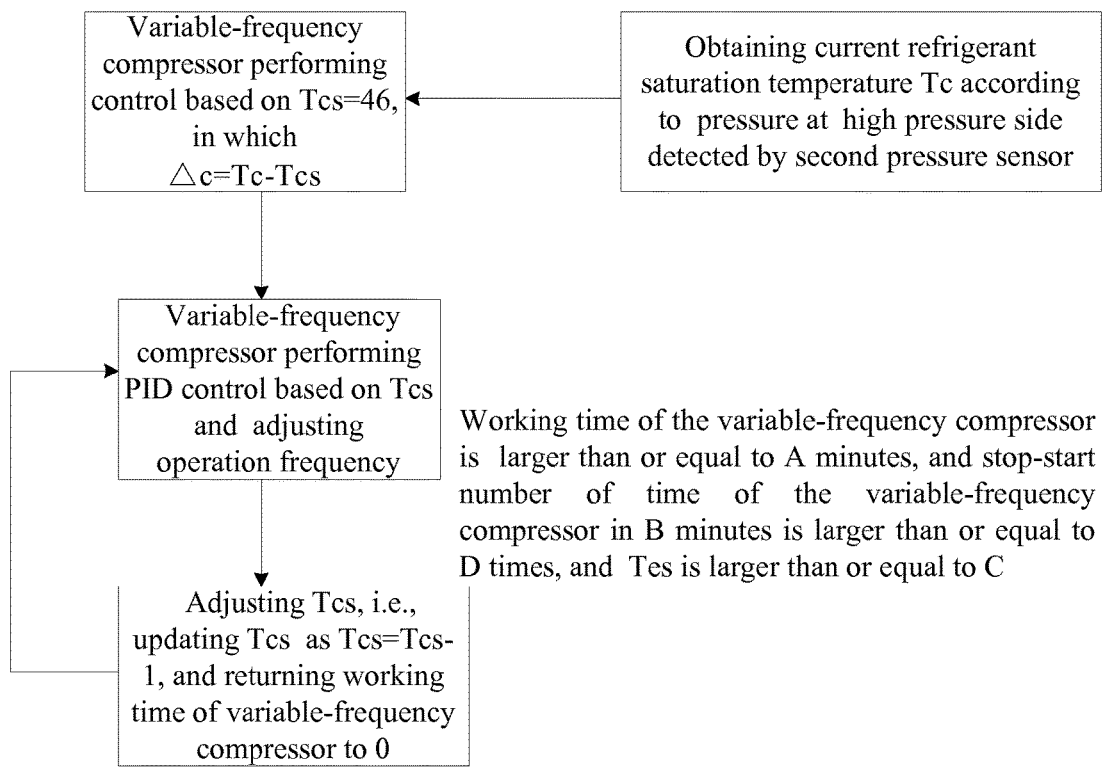
FIG. 8 is a flow chart showing a control logic of an air conditioning system according to a sixth embodiment of the present invention.

As shown in FIG. 8, in the heating mode, the second pressure sensor 24 configured to detect the pressure at the high pressure side is disposed in the outdoor apparatus 2. The outdoor apparatus 2 operates to heat according to the control signal indicating the mode option instruction and the control signal indicating the on-off instruction.

Moreover, if the indoor apparatus 1 is started for the first time in the predetermined working cycle, the controller 21 determines the target refrigerant saturation temperature Tcs according to the current ambient temperature of the outdoor apparatus 2. For example, when the current ambient temperature of the outdoor apparatus 2 is between 7° C. and 10° C., the initial target refrigerant saturation temperature is determined as 46° C.

Subsequently, the controller 21 generates the current refrigerant saturation temperature Tc according to the second pressure detecting signal generated by the second pressure sensor 24. And then the controller 21 performs the PID adjustment on the current refrigerant saturation temperature Tc according to the target refrigerant saturation temperature Tcs.

In the embodiment of the present invention, when the working time of the variable-frequency compressor Mc is larger than or equal to a third time threshold (such as A minutes), the controller determines whether to adjust the target refrigerant saturation temperature Tcs according to the received stop-start number of time of the variable-frequency compressor and an indoor capability requirement, i.e., the controller determines whether the stop-start number of time of the variable-frequency compressor in a third predetermined period (such as B minutes) is larger than or equal to a second predetermined number of time threshold (such as D times) and whether the target refrigerant saturation temperature Tcs is larger than or equal to a predetermined saturation temperature threshold C, so as to determine whether it is needed to adjust the target refrigerant saturation temperature Tcs.

In the embodiment of the present invention, when the working time of the variable-frequency compressor Mc is larger than or equal to the third time threshold (such as A minutes), and the normally recorded stop-start number of time of the variable-frequency compressor in B minutes is larger than or equal to D times, and the target refrigerant saturation temperature Tcs is larger than or equal to C, a heating load of the indoor apparatus 1 is determined as relatively smaller and the controller 21 adjusts the target refrigerant saturation temperature Tcs according to the predetermined step length, that is, the controller 21 keeps revising the target refrigerant saturation temperature Tcs downwards, for example the current refrigerant saturation temperature Tcs is updated as Tcs=Tcs−1. Simultaneously, the working time of the variable-frequency compressor Mc returns to 0 and is retimed from this moment, and an updated target refrigerant saturation temperature Tcs is used to perform the PID adjustment on the current refrigerant saturation temperature Tc constantly. And thus the variable-frequency compressor may lower its rotating speed so as to reduce a refrigerating capacity, such that an indoor temperature is decreased slowly and a frequent stop of the outdoor apparatus 2 is reduced. Simultaneously, the current target refrigerant saturation temperature is recorded as the initial target refrigerant saturation temperature of the next start.

Thus, the air conditioning system according to embodiments of the present invention makes an identification and determination according to influence of indoor loads on operation parameters of the refrigerating system so as to adjust the operation frequency of the variable-frequency compressor intelligently.

In an embodiment of the present invention, the operation parameters of the variable-frequency compressor include a working time and a working frequency or a working current of the variable-frequency compressor, in which when the working time of the variable-frequency compressor is larger than or equal to a fourth time threshold, and a current working frequency of the variable-frequency compressor is larger than or equal to a predetermined frequency threshold or a current working current of the variable-frequency compressor is larger than or equal to a predetermined current threshold, the controller adjusts the target refrigerant saturation temperature according to a predetermined step length.

Specifically, a control process of the air conditioning system will be described in following two embodiments of the heating mode and the refrigerating mode respective.

Embodiment 7

Figure 9:
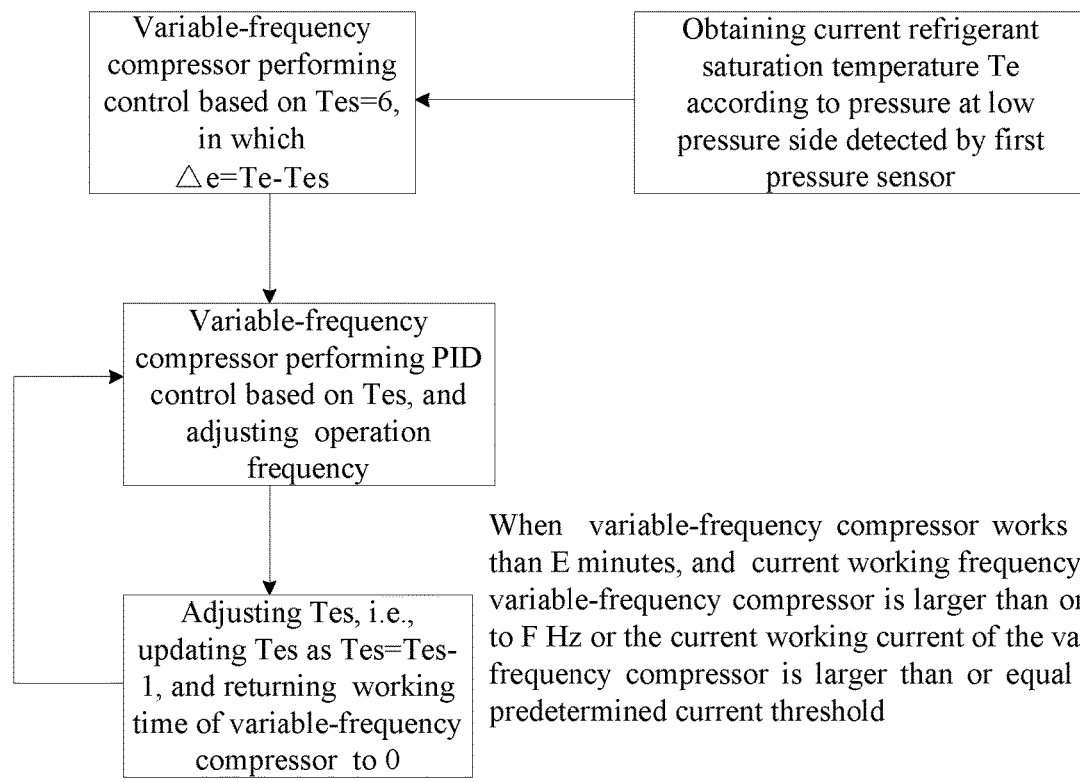
FIG. 9 is a flow chart showing a control logic of an air conditioning system according to a seventh embodiment of the present invention.

As shown in FIG. 9, in the refrigerating mode, the first pressure sensor 23 configured to detect the pressure at the low pressure side is disposed in the outdoor apparatus 2. The outdoor apparatus 2 operates to refrigerate according to the control signal indicating the mode option instruction and the control signal indicating the on-off instruction.

Moreover, if the indoor apparatus 1 is started for the first time in the predetermined working cycle, the controller 21 determines the target refrigerant saturation temperature Tes according to the current ambient temperature of the outdoor apparatus 2. For example, when the current ambient temperature of the outdoor apparatus 2 is between 30° C. and 35° C., an initial target refrigerant saturation temperature may be set as 6° C.; when the current ambient temperature of the outdoor apparatus 2 is between 35° C. and 40° C., the initial target refrigerant saturation temperature may be set as 3° C.; when the current ambient temperature of the outdoor apparatus 2 is between 25° C. and 30° C., the initial target refrigerant saturation temperature may be set as 8° C. When the indoor apparatus 1 is not started for the first time in the predetermined working cycle, the recorded adjusted target refrigerant saturation temperature in a last stop is set as the initial target refrigerant saturation temperature of the outdoor apparatus 2 in a current start.

Subsequently, the controller 21 generates the current refrigerant saturation temperature Te according to the first pressure detecting signal generated by the first pressure sensor 23. And then the controller 21 performs a PID (Proportion Integration Differentiation) adjustment on the current refrigerant saturation temperature Te according to the target refrigerant saturation temperature Tes. The PID adjustment is illustrated as follows.

A difference between the current refrigerant saturation temperature Te and the target refrigerant saturation temperature Tes is denoted as $\Delta e = Te - Tes$. For example, the current refrigerant saturation temperature Te is 10, the target refrigerant saturation temperature Tes is 6, and then a current difference is denoted as $\Delta e0 = 10 - 6 = 4$. Since sampled data are discrete, according to a difference value of a previous $\Delta e1$ (i.e., a difference of a certain period (such as 40 s) ago) and a current $\Delta e0$ or a weighted value of the previous $\Delta e1$ and the current $\Delta e0$, feedback quantities of $\Delta e0$ and $\Delta e1$ can be determined to perform the PID adjustment so as to obtain an operation frequency variation of the variable-frequency compressor. A rotating speed of the variable-frequency compressor is equal to a sum of a current rotating speed and a rotating speed variation, and the rotating speed variation of the variable-frequency compressor is represented as $(Kp + Ki/s + Kd*s)*E(\Delta e1, \Delta e0)$, where Kp, Ki, s, Kd are predetermined constants, and $\Delta e1$, $\Delta e0$ are real-time feedback quantities.

In the embodiment of the present invention, when the working time of the variable-frequency compressor Mc is larger than or equal to a fourth time threshold (such as E minutes), the controller compares the current working frequency of the variable-frequency compressor with a predetermined frequency threshold (such as F Hz) to determine whether it is needed to adjust the target refrigerant saturation temperature Tes, or the controller compares a current working current of the variable-frequency compressor with a predetermined current threshold to determine whether it is needed to adjust the target refrigerant saturation temperature Tes.

When the variable-frequency compressor works for E minutes, and the current working frequency of the variable-frequency compressor is larger than or equal to the predetermined frequency threshold (such as F Hz) or the current working current of the variable-frequency compressor is larger than or equal to the predetermined current threshold, a refrigerating load of the indoor apparatus 1 is determined as relatively larger and the controller 21 adjusts the target refrigerant saturation temperature Tes according to the predetermined step length, that is, the controller 21 keeps revising the target refrigerant saturation temperature Tes downwards, for example the current refrigerant saturation temperature Tes is updated as Tes=Tes−1. Simultaneously, the working time of the variable-frequency compressor Mc returns to 0 and is retimed from this moment, and an updated target refrigerant saturation temperature Tes is used to perform the PID adjustment on the current refrigerant saturation temperature Te constantly. Thereby, a rotating speed of the variable-frequency compressor is increased and a suction pressure of the variable-frequency compressor is decreased, such that an indoor temperature can reach a predetermined target. Simultaneously, the current target refrigerant saturation temperature is recorded as the initial target refrigerant saturation temperature of the next start.

Thus, the air conditioning system according to embodiments of the present invention makes an identification and determination according to influence of indoor loads on operation parameters of the refrigerating system so as to adjust the operation frequency of the variable-frequency compressor intelligently.

Embodiment 8

Figure 10:
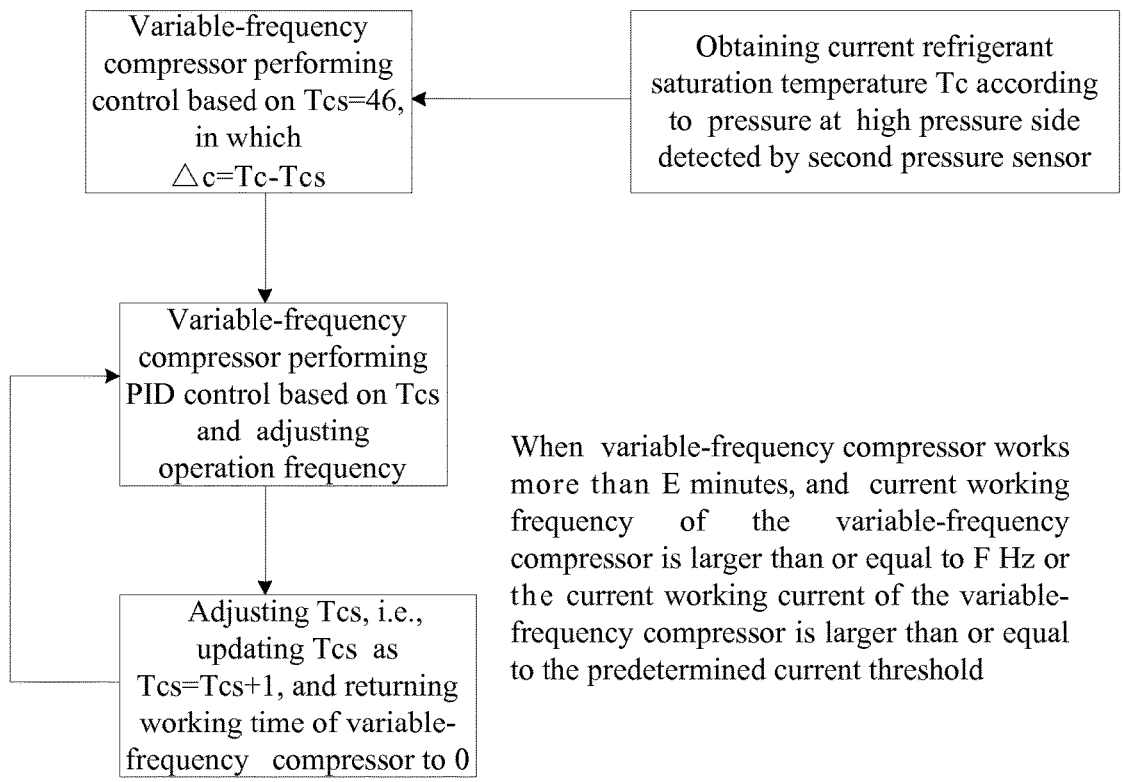
FIG. 10 is a flow chart showing a control logic of an air conditioning system according to an eighth embodiment of the present invention.

As shown in FIG. 10, in the heating mode, the second pressure sensor 24 configured to detect the pressure at the high pressure side is disposed in the outdoor apparatus 2. The outdoor apparatus 2 operates to heat according to the control signal indicating the mode option instruction and the control signal indicating the on-off instruction.

Moreover, if the indoor apparatus 1 is started for the first time in the predetermined working cycle, the controller 21 determines the target refrigerant saturation temperature Tcs according to the current ambient temperature of the outdoor apparatus 2. For example, when the current ambient temperature of the outdoor apparatus 2 is between 7° C. and 10° C., the initial target refrigerant saturation temperature is determined as 46° C. When the indoor apparatus 1 is not started for the first time in the predetermined working cycle, the recorded adjusted target refrigerant saturation temperature in the last stop is set as the initial target refrigerant saturation temperature of the outdoor apparatus 2 in the current start.

Subsequently, the controller 21 generates the current refrigerant saturation temperature Tc according to the second pressure detecting signal generated by the second pressure sensor 24. And then the controller 21 performs the PID adjustment on the current refrigerant saturation temperature Tc according to the target refrigerant saturation temperature Tcs.

In the embodiment of the present invention, when the working time of the variable-frequency compressor Mc is larger than or equal to a fourth time threshold (such as E minutes), the controller compares the current working frequency of the variable-frequency compressor with a predetermined frequency threshold (such as F Hz) to determine whether it is needed to adjust the target refrigerant saturation temperature Tcs, or the controller compares the current working current of the variable-frequency compressor with a predetermined current threshold to determine whether it is needed to adjust the target refrigerant saturation temperature Tcs.

When the variable-frequency compressor works for E minutes, and the current working frequency of the variable-frequency compressor is larger than or equal to the predetermined frequency threshold (such as F Hz) or the current working current of the variable-frequency compressor is larger than or equal to the predetermined current threshold, a heating load of the indoor apparatus 1 is determined as relatively larger and the controller 21 adjusts the target refrigerant saturation temperature Tcs according to the predetermined step length, that is, the controller 21 keeps revising the target refrigerant saturation temperature Tcs upwards, for example the current refrigerant saturation temperature Tcs is updated as Tcs=Tcs+1. Simultaneously, the working time of the variable-frequency compressor Mc returns to 0 and is retimed from this moment, and an updated target refrigerant saturation temperature Tcs is used to perform the PID adjustment on the current refrigerant saturation temperature Tc constantly. Thus, the rotating speed of the variable-frequency compressor is increased and a discharging pressure at the high pressure side is increased as rapidly as possible, such that an indoor temperature can reach a predetermined target. Simultaneously, the current target refrigerant saturation temperature is recorded as the initial target refrigerant saturation temperature of the next start.

Thus, the air conditioning system according to embodiments of the present invention makes an identification and determination according to influence of indoor loads on operation parameters of the refrigerating system so as to adjust the operation frequency of the variable-frequency compressor intelligently.

In an embodiment of the present invention, the operation parameters of the variable-frequency compressor include a working time of the variable-frequency compressor, in which when the working time of the variable-frequency compressor is larger than or equal to a fifth time threshold and the variable-frequency compressor has not stopped, the controller adjusts the target refrigerant saturation temperature according to a predetermined step length.

Specifically, a control process of the air conditioning system will be described in following two embodiments of the heating mode and the refrigerating mode respectively.

Embodiment 9

Figure 11:
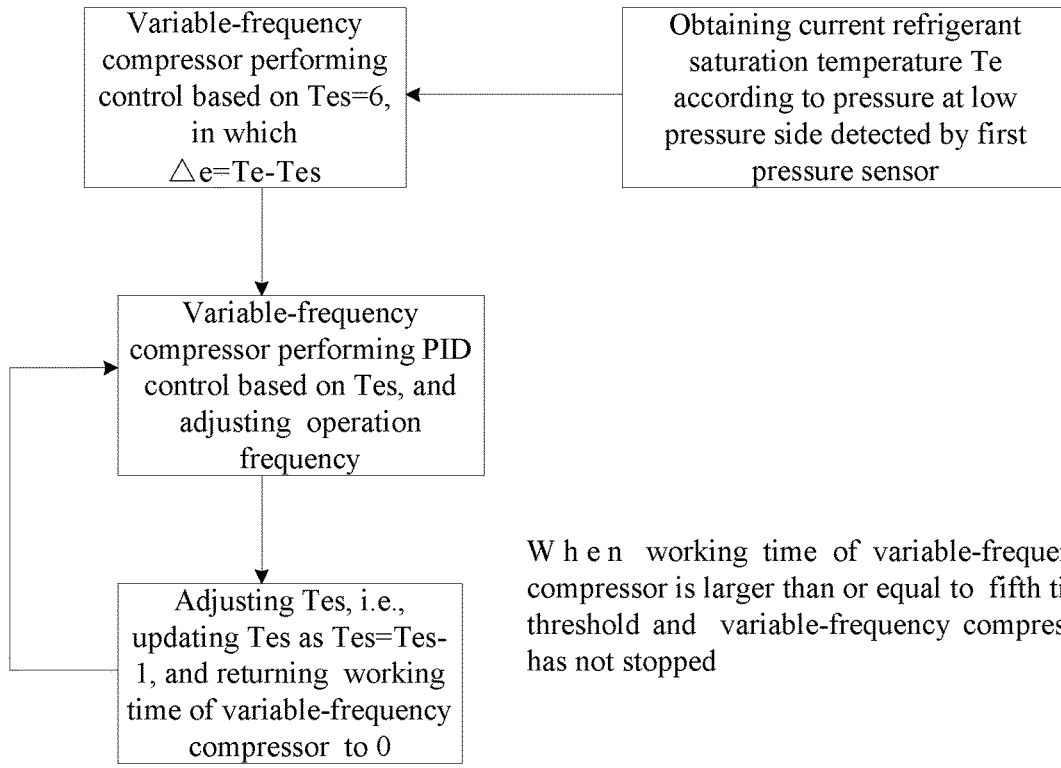
FIG. 11 is a flow chart showing a control logic of an air conditioning system according to a ninth embodiment of the present invention.

As shown in FIG. 11, in the refrigerating mode, the first pressure sensor 23 configured to detect the pressure at the low pressure side is disposed in the outdoor apparatus 2. The outdoor apparatus 2 starts or stops a refrigerating system according to the control signal indicating the mode option instruction and the control signal indicating the on-off instruction. The controller 21 delays a predetermined period (such as S seconds) to start or stop after receiving the control signal indicating the on-off instruction, so as to prevent the controller 21 from executing incorrect instruction caused by misoperation, i.e., the controller 21 delays the predetermined period (such as S seconds) to start or stop after receiving the on-off instruction.

Moreover, if the indoor apparatus 1 is started for the first time in the predetermined working cycle, the controller 21 determines the target refrigerant saturation temperature Tes according to the current ambient temperature of the outdoor apparatus 2. For example, when the current ambient temperature of the outdoor apparatus 2 is between 30° C. and 35° C., an initial target refrigerant saturation temperature may be set as 6° C.; when the current ambient temperature of the outdoor apparatus 2 is between 35° C. and 40° C., the initial target refrigerant saturation temperature may be set as 3° C.; when the current ambient temperature of the outdoor apparatus 2 is between 25° C. and 30° C., the initial target refrigerant saturation temperature may be set as 8° C. When the indoor apparatus 1 is not started for the first time in the predetermined working cycle, the recorded adjusted target refrigerant saturation temperature in a last stop is set as the initial target refrigerant saturation temperature of the outdoor apparatus 2 in a current start.

Subsequently, the controller 21 generates the current refrigerant saturation temperature Te according to the first pressure detecting signal generated by the first pressure sensor 23. And then the controller 21 performs a PID (Proportion Integration Differentiation) adjustment on the current refrigerant saturation temperature Te according to the target refrigerant saturation temperature Tes. The PID adjustment is illustrated as follows.

A difference between the current refrigerant saturation temperature Te and the target refrigerant saturation temperature Tes is denoted as $\Delta e=Te-Tes$. For example, the current refrigerant saturation temperature Te is 10, the target refrigerant saturation temperature Tes is 6, and then a current difference is denoted as $\Delta e0=10-6=4$. Since sampled data are discrete, according to a difference value of a previous $\Delta e1$ (i.e., a difference of a certain period (such as 40 s) ago) and a current $\Delta e0$ or a weighted value of the previous $\Delta e1$ and the current $\Delta e0$, feedback quantities of $\Delta e0$ and $\Delta e1$ can be determined to perform the PID adjustment so as to obtain an operation frequency variation of the variable-frequency compressor. A rotating speed of the variable-frequency compressor is equal to a sum of a current rotating speed and a rotating speed variation, and the rotating speed variation of the variable-frequency compressor is represented as $(Kp+Ki/s+Kd*s)*E(\Delta e1, \Delta e0)$, where Kp, Ki, s, Kd are predetermined constants, and $\Delta e1$, $\Delta e0$ are real-time feedback quantities.

In the embodiment of the present invention, when the working time of the variable-frequency compressor Mc is larger than or equal to a fifth time threshold, the controller determines whether the variable-frequency compressor Mc has stopped to determine whether it is needed to adjust the target refrigerant saturation temperature Tes.

If the working time of the variable-frequency compressor Mc is larger than or equal to the fifth time threshold and the variable-frequency compressor Mc has not stopped, a refrigerating load of the indoor apparatus 1 is determined as relatively larger and the controller 21 adjusts the target refrigerant saturation temperature Tes according to the predetermined step length, that is, the controller 21 keeps revising the target refrigerant saturation temperature Tes downwards, for example the current refrigerant saturation temperature Tes is updated as Tes=Tes−1. Simultaneously, the working time of the variable-frequency compressor Mc returns to 0 and is retimed from this moment, and an updated target refrigerant saturation temperature Tes is used to perform the PID adjustment on the current refrigerant saturation temperature Te constantly. Thereby, a rotating speed of the variable-frequency compressor is increased and a suction pressure of the variable-frequency compressor is decreased, such that an indoor temperature can reach a predetermined target. Simultaneously, the current target refrigerant saturation temperature is recorded as the initial target refrigerant saturation temperature of the next start.

Thus, the air conditioning system according to embodiments of the present invention makes an identification and determination according to influence of indoor loads on operation parameters of the refrigerating system so as to adjust the operation frequency of the variable-frequency compressor intelligently.

Embodiment 10

Figure 12:
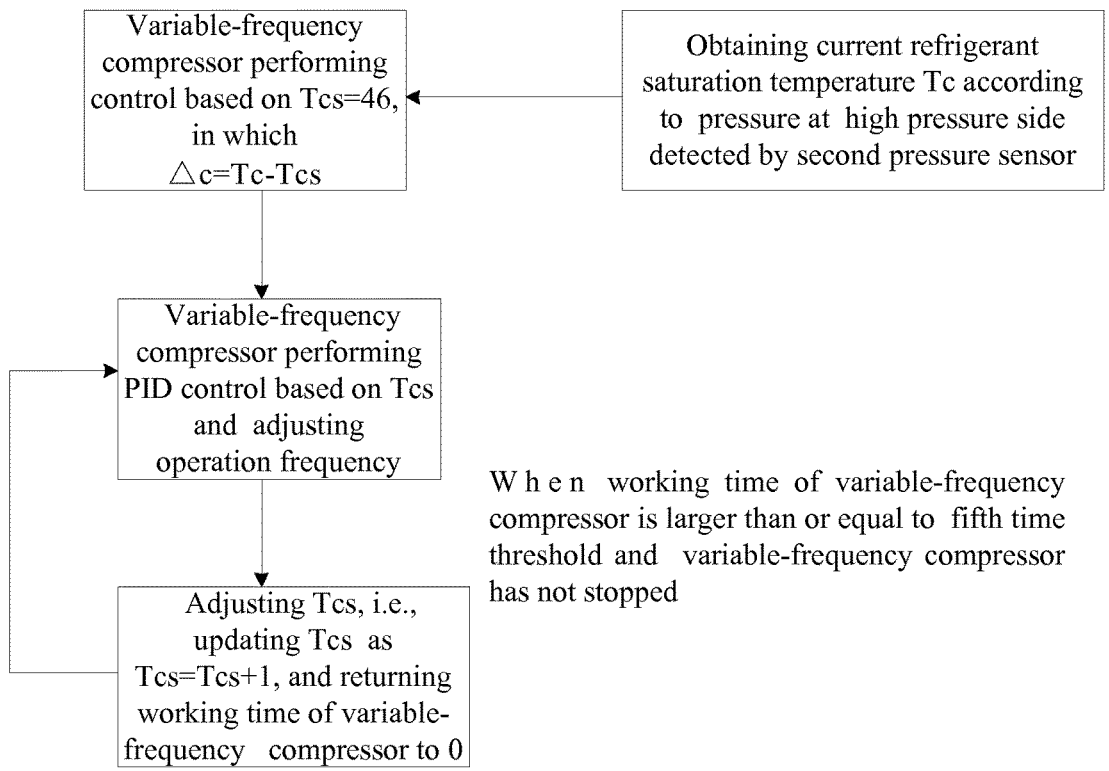
FIG. 12 is a flow chart showing a control logic of an air conditioning system according to a tenth embodiment of the present invention.

As shown in FIG. 12, in the heating mode, the second pressure sensor 24 configured to detect the pressure at the high pressure side is disposed in the outdoor apparatus 2. The outdoor apparatus 2 starts or stops a heating system according to the control signal indicating the mode option instruction and the control signal indicating the on-off instruction. The controller 21 delays a second predetermined period (such as S seconds) to start or stop after receiving the control signal indicating the on-off instruction, so as to prevent the controller 21 from executing incorrect instruction caused by misoperation.

Moreover, if the indoor apparatus 1 is started for the first time in the predetermined working cycle, the controller 21 determines the target refrigerant saturation temperature Tcs according to the current ambient temperature of the outdoor apparatus 2. For example, when the current ambient temperature of the outdoor apparatus 2 is between 7° C. and 10° C., the initial target refrigerant saturation temperature is determined as 46° C. When the indoor apparatus 1 is not started for the first time in the predetermined working cycle, the recorded adjusted target refrigerant saturation temperature in the last stop is set as the initial target refrigerant saturation temperature of the outdoor apparatus 2 in the current start.

Subsequently, the controller 21 generates the current refrigerant saturation temperature Tc according to the second pressure detecting signal generated by the second pressure sensor 24. And then the controller 21 performs the PID adjustment on the current refrigerant saturation temperature Tc according to the target refrigerant saturation temperature Tcs.

In the embodiment of the present invention, when the working time of the variable-frequency compressor Mc is larger than or equal to a fifth time threshold, the controller determines whether the variable-frequency compressor Mc has stopped to determine whether it is needed to adjust the target refrigerant saturation temperature Tcs.

If the working time of the variable-frequency compressor Mc is larger than or equal to the fifth time threshold and the variable-frequency compressor Mc has not stopped, a heating load of the indoor apparatus 1 is determined as relatively larger and the controller 21 adjusts the target refrigerant saturation temperature Tcs according to the predetermined step length, that is, the controller 21 keeps revising the target refrigerant saturation temperature Tcs upwards, for example the current refrigerant saturation temperature Tcs is updated as Tcs=Tcs+1. Simultaneously, the working time of the variable-frequency compressor Mc returns to 0 and is retimed from this moment, and an updated target refrigerant saturation temperature Tcs is used to perform the PID adjustment on the current refrigerant saturation temperature Tc constantly. Thus, a rotating speed of the variable-frequency compressor is increased and a discharging pressure at the high pressure side is increased as rapidly as possible, such that an indoor temperature can reach a predetermined target. Simultaneously, the current target refrigerant saturation temperature is recorded as the initial target refrigerant saturation temperature of the next start.

Thus, the air conditioning system according to embodiments of the present invention makes an identification and determination according to influence of indoor loads on operation parameters of the refrigerating system so as to adjust the operation frequency of the variable-frequency compressor intelligently.

In embodiments of the present invention, the air conditioning system may have a plurality of loads or a single load, and may only have refrigerating function or have both refrigerating and heating functions. The indoor apparatus does not transmit parameters (such as the indoor ambient temperature) to the outdoor apparatus, and the outdoor apparatus is controlled to start or stop according to the on-off instruction sent from the remote, the line controller or the indoor apparatus. With the air conditioning system according to embodiments of the present invention, the variable-frequency compressor may be controlled without parameter communication between the indoor apparatus and the outdoor apparatus. The controller of the outdoor apparatus may learn independently how to control the variable-frequency compressor and completes controlling the variable-frequency compressor and other electrical components of the outdoor apparatus, such that the indoor temperature can reach and maintain a predetermined temperature.

According to embodiments of the present invention, when receiving the control signal indicating the on-off instruction, the controller 21 delays the predetermined period (such as S seconds) to start or stop, so as to prevent the controller 21 from executing incorrect instruction caused by misoperation.

With the air conditioning system according to embodiments of the present invention, the controller of the outdoor apparatus performs the variable-frequency control on the variable-frequency compressor according to the operation parameters of the variable-frequency compressor, independent from the indoor apparatus and without parameter communication between the indoor apparatus and the outdoor apparatus, such that the structure of the air conditioning system is simplified and the cost is greatly reduced.

A method for controlling an air conditioning system according to embodiments of the present invention is described in the following with reference to the drawings.

Figure 13:
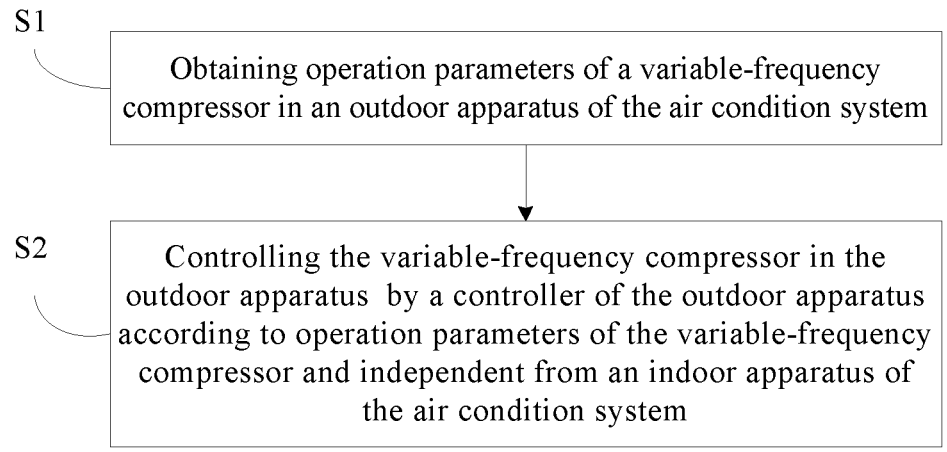
FIG. 13 is a flow chart of a method for controlling an air conditioning system according to an embodiment of the present invention.

FIG. 13 is a flow chart of a method for controlling an air conditioning system. As shown in FIG. 13, the method for controlling the air conditioning system includes following steps.

At step S1, operation parameters of a variable-frequency compressor in an outdoor apparatus of the air conditioning system are obtained.

At step S2, the variable-frequency compressor in the outdoor apparatus is controlled by a controller of the outdoor apparatus according to the operation parameters of the variable-frequency compressor and independent from an indoor apparatus of the air conditioning system.

In other words, after the air conditioning system is started, a first pressure sensor and/or a second pressure sensor of the outdoor apparatus detects the pressure at a return-air low side (i.e., admittance pressure) and/or an exhaust high side, and a temperature sensor detects the current ambient temperature of the outdoor apparatus, and then the detected admittance pressure and/or the pressure at the exhaust high side and the detected current ambient temperature of the outdoor apparatus are transmitted to a system parameter sampling module. The controller generates control signals according to these detected parameters so as to perform a variable-frequency control on the variable-frequency compressor and to perform corresponding controls on an outdoor fan, an outdoor expansion valve and an outdoor four-way valve respectively.

In an embodiment of the present invention, the method for controlling the air conditioning system further includes following steps. When the working mode is the refrigerating mode, a first pressure detecting signal is obtained by a first pressure sensor disposed at an inlet of the variable-frequency compressor. In other words, when the air conditioning system is a refrigerating-only air condition, in order to detect the pressure at the return-air low pressure side of the variable-frequency compressor during the refrigeration of the air conditioning system, only the first pressure sensor is required to be disposed at a return-air pipe of the variable-frequency compressor.

In another embodiment of the present invention, the method for controlling the air conditioning system further includes following steps. When the working mode is the heating mode, a second pressure detecting signal can be detected by a second pressure sensor disposed at an outlet of the variable-frequency compressor. In other words, when the air conditioning system is a refrigerating and heating air condition, in order to detect the pressure at the exhaust high pressure side of the variable-frequency compressor during the heating of the air conditioning system, the second pressure sensor is further required to be disposed at an exhaust pipe of the variable-frequency compressor. Alternatively, a pressure sensor may be disposed in rear of a four-way value. When the air conditioning system is in the refrigerating mode, the pressure detected by the pressure sensor which is the pressure at the low pressure side is generally equal to the return-air low pressure; when the air conditioning system is in the heating mode, the pressure detected by the pressure sensor which is the pressure at the high pressure side is generally equal to the exhaust high pressure.

In an embodiment of the present invention, the controller performs the variable-frequency control on the variable-frequency compressor according to the operation parameters of the variable-frequency compressor, which is implemented by following steps.

At step S11, a current refrigerant saturation temperature is generated by selecting one of the first pressure detecting signal and the second detecting signal according to the working mode.

At step S12, a target refrigerant saturation temperature is obtained.

At step S13, the variable-frequency control is performed on the variable-frequency compressor according to the target refrigerant saturation temperature and the current refrigerant saturation temperature, and the target refrigerant saturation temperature is adjusted according to the operation parameters of the variable-frequency compressor during the variable-frequency control.

In an embodiment of the present invention, when the outdoor apparatus is stopped, an adjusted target refrigerant saturation temperature is set as the refrigerant saturation temperature of the outdoor apparatus in a next start.

If the outdoor apparatus is started for a first time in a predetermined working cycle, the controller determines the target refrigerant saturation temperature according to the current ambient temperature of the outdoor apparatus. It should be noted that, the predetermined working cycle should be understood broadly and may be several years or several months. For example, the outdoor apparatus is stopped in summer and is re-started in winter. When the outdoor apparatus is started for the first time in winter, the controller determines the target refrigerant saturation temperature according to the current ambient temperature of the outdoor apparatus, instead of using the adjusted target refrigerant saturation temperature recorded at a last stop (i.e., in summer several months ago).

In a further embodiment of the present invention, the operation parameters of the variable-frequency compressor include a working time of the variable-frequency compressor and a stop-start number of time of the variable-frequency compressor in a first predetermined period, and the target refrigerant saturation temperature is adjusted according to the operation parameters of the variable-frequency compressor by following steps: it is determined whether the working time of the variable-frequency compressor is larger than or equal to a first time threshold; if yes, the stop-start number of time of the variable-frequency compressor in the first predetermined period is obtained; and if the stop-start number of time of the variable-frequency compressor in the first predetermined period is larger than or equal to a first predetermined number of time threshold, the target refrigerant saturation temperature is adjusted according to a predetermined step length.

A control process for adjusting the target refrigerant saturation temperature according to the operation parameters of the variable-frequency compressor in the above embodiment is similar to descriptions in Embodiment 1 and Embodiment 2, and thus it is omitted herein.

In an embodiment of the present invention, the operation parameters of the variable-frequency compressor include a working time and a working frequency or a working current of the variable-frequency compressor, and the target refrigerant saturation temperature is adjusted according to the operation parameters of the variable-frequency compressor by following steps: it is determined whether the working time of the variable-frequency compressor is larger than or equal to a second time threshold; if yes, a current working frequency or a current working current of the variable-frequency compressor and a working frequency or a working current of the variable-frequency compressor before a second predetermined period are obtained; if the current working frequency is less than the working frequency before the second predetermined period or the current working current is less than the working current before the second predetermined period, the target refrigerant saturation temperature is kept changed; if the current working frequency is larger than or equal to the working frequency before the second predetermined period or the current working current is larger than or equal to the working current before the second predetermined period, the target refrigerant saturation temperature is adjusted according to a predetermined step length.

A control process for adjusting the target refrigerant saturation temperature according to the operation parameters of the variable-frequency compressor in the above embodiment is similar to descriptions in Embodiment 3 and Embodiment 4, and thus it is omitted herein.

In an embodiment of the present invention, the operation parameters of the variable-frequency compressor include a working time of the variable-frequency compressor and a stop-start number of time of the variable-frequency compressor in a third predetermined period, and the target refrigerant saturation temperature is adjusted according to the operation parameters of the variable-frequency compressor by following steps: it is determined whether the working time of the variable-frequency compressor is larger than or equal to a third time threshold; if yes, the stop-start number of time of the variable-frequency compressor in the third predetermined period is obtained; and if the stop-start number of time of the variable-frequency compressor in the third predetermined period is larger than or equal to a second predetermined number of time threshold, it is determined whether the target refrigerant saturation temperature is larger than or equal to a predetermined saturation temperature threshold; if yes, the target refrigerant saturation temperature according to a predetermined step length is adjusted.

A control process for adjusting the target refrigerant saturation temperature according to the operation parameters of the variable-frequency compressor in the above embodiment is similar to descriptions in Embodiment 5 and Embodiment 6, and thus it is omitted herein.

In an embodiment of the present invention, the operation parameters of the variable-frequency compressor include a working time and a working frequency or a working current of the variable-frequency compressor, and the target refrigerant saturation temperature is adjusted according to the operation parameters of the variable-frequency compressor by following steps: it is determined whether the working time of the variable-frequency compressor is larger than or equal to a fourth time threshold; if yes, a current working frequency or a current working current of the variable-frequency compressor is obtained; it is determined whether the current working frequency of the variable-frequency compressor is larger than or equal to a predetermined frequency threshold or the current working current of the variable-frequency compressor is larger than or equal to a predetermined current threshold; if yes, the target refrigerant saturation temperature is adjusted according to a predetermined step length.

A control process for adjusting the target refrigerant saturation temperature according to the operation parameters of the variable-frequency compressor in the above embodiment is similar to descriptions in Embodiment 7 and Embodiment 8, and thus it is omitted herein.

In an embodiment of the present invention, the operation parameters of the variable-frequency compressor include a working time of the variable-frequency compressor, and the target refrigerant saturation temperature is adjusted according to the operation parameters of the variable-frequency compressor by following steps: it is determined whether the working time of the variable-frequency compressor is larger than a fifth time threshold; if the working time of the variable-frequency compressor is larger than the fifth time threshold and the variable-frequency compressor has not stopped, the target refrigerant saturation temperature is adjusted according to a predetermined step length.

A control process for adjusting the target refrigerant saturation temperature according to the operation parameters of the variable-frequency compressor in the above embodiment is similar to descriptions in Embodiment 9 and Embodiment 10, and thus it is omitted herein.

In an embodiment of the present invention, when receiving the control signal indicating the on-off instruction, the controller delays a predetermined period (such as S seconds) to start or stop, so as to prevent the controller from executing incorrect instruction caused by misoperation.

With the method for controlling the air conditioning system according to embodiments of the present invention, the controller of the outdoor apparatus in the air conditioning system performs the variable-frequency control on the variable-frequency compressor according to the operation parameters of the variable-frequency compressor independent from the indoor apparatus and without transmitting corresponding control parameters between the indoor apparatus and the outdoor apparatus via a specific communication, thus reducing a complexity of the air conditioning system and improving the reliability of the air conditioning system.

An outdoor apparatus of an air conditioning system according to embodiments of the present invention will be described in the following with reference to the drawings.

Figure 14:
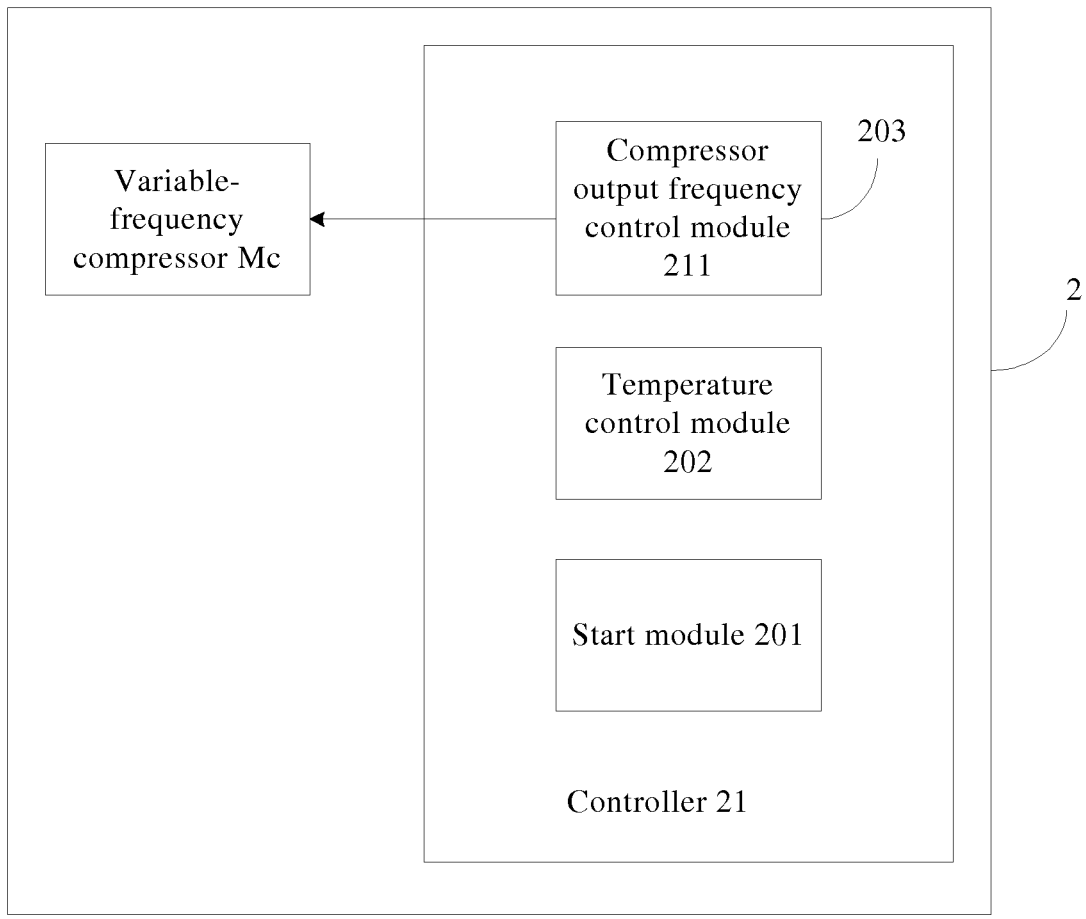
FIG. 14 is a block diagram of an outdoor apparatus of an air conditioning system according to an embodiment of the present invention.

FIG. 14 is a block diagram of an outdoor apparatus of an air conditioning system according to an embodiment of the present invention. As shown in FIG. 14, the outdoor apparatus 2 includes a variable-frequency compressor Mc and a controller 21.

The controller 21 is configured to control the variable-frequency compressor Mc and includes: a start module 201, a temperature control module 202 and a variable-frequency control module 203 (i.e., a compressor output frequency control module 211 shown in FIG. 1B or 2).

The start module 201 is configured to obtain a working mode of the air conditioning system and to start the variable-frequency compressor Mc according to the working mode of the air condition. The temperature control module 202 is configured to obtain an initial target refrigerant saturation temperature and to adjust a target refrigerant saturation temperature according to operation parameters of the variable-frequency compressor Mc during the variable-frequency control for the variable-frequency compressor Mc. The variable-frequency control module 203 (i.e., the compressor output frequency control module 211) is configured to perform the variable-frequency control on the variable-frequency compressor Mc according to the target refrigerant saturation temperature.

In an embodiment of the present invention, the temperature control module 202 is further configured to set an adjusted target refrigerant saturation temperature as the refrigerant saturation temperature of the outdoor apparatus 2 in a next start, when the outdoor apparatus 2 is stopped.

As shown in FIG. 1B, the outdoor apparatus 2 further includes a first pressure sensor 23 disposed at an inlet of the variable-frequency compressor Mc, and the first pressure sensor 23 is configured to generate a first pressure detecting signal when a working mode of the air conditioning system is a refrigerating mode. When the air conditioning system has just a refrigerating function, only the first pressure sensor 23 is required to be disposed at a return-air pipe of the variable-frequency compressor Mc to detect a pressure at a return-air low pressure side of the variable-frequency compressor Mc when the air conditioning system is in the refrigerating mode.

In an embodiment of the present invention, as shown in FIG. 2, the outdoor apparatus 2 further includes a second pressure sensor disposed at an outlet of the variable-frequency compressor Mc, and the second pressure sensor 24 is configured to generate a second pressure detecting signal when the working mode is a heating mode. In other words, when the air conditioning system is a refrigerating and heating air condition, the second pressure sensor 24 is further required to be disposed at an exhaust pipe of the variable-frequency compressor Mc to detect a pressure at an exhaust high pressure side when the air conditioning system is in the heating mode. Alternatively, a pressure sensor may be disposed in rear of a four-way value, such that when the air conditioning system is in the refrigerating mode, a pressure detected by the pressure sensor is a pressure at the low pressure side which is generally equal to the pressure at the return-air low pressure side and when the air conditioning system is in the heating mode, the pressure detected by the pressure sensor is a pressure at the high pressure side which is generally equal to the pressure at the exhaust high pressure side.

The temperature control module 202 is further configured to generate a current refrigerant saturation temperature by selecting one of the first pressure detecting signal and the second detecting signal according to the working mode, to obtain a target refrigerant saturation temperature and to perform the variable-frequency control on the variable-frequency compressor Mc according to the target refrigerant saturation temperature and the current refrigerant saturation temperature.

As shown in FIG. 1B or FIG. 2, the outdoor apparatus 2 further includes a temperature sensor 25. The temperature sensor 25 is further configured to detect the current ambient temperature of the outdoor apparatus 2. If the outdoor apparatus 2 is started for the first time in the predetermined working cycle, the temperature control module 202 determines the target refrigerant saturation temperature according to the current ambient temperature of the outdoor apparatus 2. It should be noted that, the predetermined working cycle should be understood broadly and may be several years or several months. For example, the outdoor apparatus 2 is stopped in summer and is re-started in winter. When the outdoor apparatus 2 is started for the first time in winter, the controller 21 determines the target refrigerant saturation temperature according to the current ambient temperature of the outdoor apparatus 2, instead of using the adjusted target refrigerant saturation temperature recorded at a last stop (i.e., in summer several months ago).

In an embodiment of the present invention, the operation parameters of the variable-frequency compressor include a working time of the variable-frequency compressor and a stop-start number of time of the variable-frequency compressor in a first predetermined period. Moreover, the temperature control module 202 is further configured to adjust the target refrigerant saturation temperature according to the predetermined step length, when the working time of the variable-frequency compressor is larger than or equal to a first time threshold and the stop-start number of time of the variable-frequency compressor in the first predetermined period is larger than or equal to a first predetermined number of time threshold.

Specifically, as shown in FIG. 3, in the refrigerating mode, the first pressure sensor 23 configured to detect the pressure at the low pressure side is disposed in the outdoor apparatus 2. The start module 201 starts or stops a refrigerating system according to the control signal indicating the mode option instruction and the control signal indicating the on-off instruction. The controller 21 delays a predetermined period (such as S seconds) to start or stop after receiving the control signal indicating the on-off instruction, so as to prevent the controller 21 from executing incorrect instruction caused by misoperation.

Moreover, if the indoor apparatus 1 is started for the first time in the predetermined working cycle, the temperature control module 202 determines the target refrigerant saturation temperature Tes according to the current ambient temperature of the outdoor apparatus 2. For example, when the current ambient temperature of the outdoor apparatus 2 is between 30° C. and 35° C., an initial target refrigerant saturation temperature may be set as 6° C.; when the current ambient temperature of the outdoor apparatus 2 is between 35° C. and 40° C., the initial target refrigerant saturation temperature may be set as 3° C.; when the current ambient temperature of the outdoor apparatus 2 is between 25° C. and 30° C., the initial target refrigerant saturation temperature may be set as 8° C. When the indoor apparatus 1 is not started for the first time in the predetermined working cycle, the temperature control module 202 sets the recorded adjusted target refrigerant saturation temperature in a last stop as the initial target refrigerant saturation temperature of the outdoor apparatus 2 in a current start.

Subsequently, the temperature control module 202 generates the current refrigerant saturation temperature Te according to the first pressure detecting signal generated by the first pressure sensor 23. And then the variable-frequency control module 203 performs a PID (Proportion Integration Differentiation) adjustment on the current refrigerant saturation temperature Te according to the target refrigerant saturation temperature Tes. The PID adjustment is illustrated as follows.

A difference between the current refrigerant saturation temperature Te and the target refrigerant saturation temperature Tes is denoted as $\Delta e = Te - Tes$. For example, the current refrigerant saturation temperature Te is 10, the target refrigerant saturation temperature Tes is 6, and then a current difference is denoted as $\Delta e0 = 10 - 6 = 4$. Since sampled data are discrete, according to a difference value of a previous $\Delta e1$ (i.e., a difference of a certain period (such as 40 s) ago) and a current $\Delta e0$ or a weighted value of the previous $\Delta e1$ and the current $\Delta e0$, feedback quantities of $\Delta e0$ and $\Delta e1$ can be determined to perform the PID adjustment so as to obtain an operation frequency variation of the variable-frequency compressor. A rotating speed of the variable-frequency compressor is equal to a sum of a current rotating speed and a rotating speed variation, and the rotating speed variation of the variable-frequency compressor is represented as $(Kp + Ki/s + Kd*s) * E(\Delta e1, \Delta e0)$, where Kp, Ki, s, Kd are predetermined constants, and $\Delta e1$, $\Delta e0$ are real-time feedback quantities.

In the embodiment of the present invention, when the outdoor apparatus 2 is stopped, the temperature control module 202 determines a working time of the variable-frequency compressor Mc. If the working time of the variable-frequency compressor Mc is less than a first time threshold (such as Y minutes), this stop of the outdoor apparatus 2 is not contributed to the stop-start number of time according to which the temperature control module 202 adjusts the target refrigerant saturation temperature, so as to prevent the controller 21 from executing incorrect instructions caused by misoperation.

If the working time of the variable-frequency compressor Mc is larger than or equal to the first time threshold (such as Y minutes), this stop of the outdoor apparatus 2 is contributed to the stop-start number of time according to which the temperature control module 202 adjusts the target refrigerant saturation temperature. Moreover, when the stop-start number of time of the variable-frequency compressor within a first predetermined period (such as X minutes) is larger than or equal to a first predetermined number of time threshold (such as Z times), a refrigerating load of the indoor apparatus 1 is determined as relatively smaller and the temperature control module 202 adjusts the target refrigerant saturation temperature Tes according to the predetermined step length, that is, the temperature control module 202 keeps revising the target refrigerant saturation temperature Tes upwards, for example the current refrigerant saturation temperature Tes is updated as Tes=Tes+1. Simultaneously, the working time of the variable-frequency compressor Mc returns to 0 and is retimed from this moment, and an updated target refrigerant saturation temperature Tes is used to perform the PID adjustment on the current refrigerant saturation temperature Te constantly. And thus controlled by the variable-frequency control module 203, the variable-frequency compressor may lower its rotating speed so as to reduce a refrigerating capacity, such that an indoor temperature is decreased slowly and a frequent stop of the outdoor apparatus 2 is reduced. Simultaneously, the temperature control module 202 records the current target refrigerant saturation temperature as the initial target refrigerant saturation temperature of the next start.

Thus, the air conditioning system according to embodiments of the present invention makes an identification and determination according to influence of indoor loads on operation parameters of the refrigerating system so as to adjust the operation frequency of the variable-frequency compressor intelligently.

In Embodiment 2, as shown in FIG. 4, in the heating mode, a process of adjusting the target refrigerant saturation temperature by the temperature control module 202 is similar to that in the refrigerating mode of embodiment 1, and thus it is omitted herein.

In an embodiment of the present invention, the operation parameters of the variable-frequency compressor include a working time and a working frequency or a working current of the variable-frequency compressor, in which when the working time of the variable-frequency compressor is larger than or equal to a second time threshold, the temperature control module 202 obtains a current working frequency or a current working current of the variable-frequency compressor and a working frequency or a working current of the variable-frequency compressor before a second predetermined period; when the current working frequency is less than the working frequency before the second predetermined period or the current working current is less than the working current before the second predetermined period, the temperature control module 202 keeps the target refrigerant saturation temperature unchanged; when the current working frequency is larger than or equal to the working frequency before the second predetermined period or the current working current is larger than or equal to the working current before the second predetermined period, the temperature control module 202 adjusts the target refrigerant saturation temperature according to a predetermined step length.

Specifically, as shown in FIG. 6, in the heating mode, the second pressure sensor 24 configured to detect the pressure at the high pressure side is disposed in the outdoor apparatus 2. According to the control signal indicating the mode option instruction and the control signal indicating the on-off instruction, the start module 201 controls the outdoor apparatus 2 to heat.

Moreover, if the indoor apparatus 1 is started for the first time in the predetermined working cycle, the temperature control module 202 determines the target refrigerant saturation temperature Tcs according to the current ambient temperature of the outdoor apparatus 2. For example, when the current ambient temperature of the outdoor apparatus 2 is between 7° C. and 10° C., the initial target refrigerant saturation temperature is determined as 46° C. When the indoor apparatus 1 is not started for the first time in the predetermined working cycle, the temperature control module sets the recorded adjusted target refrigerant saturation temperature in the last stop as the initial target refrigerant saturation temperature of the outdoor apparatus 2 in the current start.

Subsequently, the temperature control module 202 generates the current refrigerant saturation temperature Tc according to the second pressure detecting signal generated by the second pressure sensor 24. And then the variable-frequency control module 203 performs the PID adjustment on the current refrigerant saturation temperature Tc according to the target refrigerant saturation temperature Tcs.

In the embodiment of the present invention, when the working time of the variable-frequency compressor Mc is larger than or equal to a second time threshold (such as U minutes), the temperature control module 202 compares a current working frequency of the variable-frequency compressor with a working frequency of the variable-frequency compressor before a second predetermined period (such as W minutes) to determine whether it is needed to adjust the target refrigerant saturation temperature Tcs, or the temperature control module 202 compares the current working current of the variable-frequency compressor with a working current of the variable-frequency compressor before the second predetermined period (such as W minutes) to determine whether it is needed to adjust the target refrigerant saturation temperature Tcs.

When the variable-frequency compressor Mc works for U minutes, and the current working frequency of the variable-frequency compressor Mc is less than the working frequency before the second predetermined period (such as W minutes) or the current working current of variable-frequency compressor Mc is less than the working current before the second predetermined period (such as W minutes), and the variable-frequency compressor Mc has not stopped, the temperature control module 202 determines not to adjust the target refrigerant saturation temperature Tcs and thus the variable-frequency compressor Mc operating under a current PID control requirement, such that an indoor temperature can reach a predetermined target gradually. Also, the current target refrigerant saturation temperature Tcs is recorded as an initial target refrigerant saturation temperature in a next start.

When the variable-frequency compressor Mc works for U minutes, and the current working frequency of the variable-frequency compressor Mc is larger than or equal to the working frequency before the second predetermined period (such as W minutes) or the current working current of variable-frequency compressor Mc is larger than or equal to the working current before the second predetermined period such as W minutes, and the variable-frequency compressor Mc has not stopped, a capability of the variable-frequency compressor Mc may be regarded as not enough to carry a desired heating load and thus the temperature control module 202 adjusts the target refrigerant saturation temperature Tcs according to the predetermined step length, that is, the temperature control module 202 keeps revising the target refrigerant saturation temperature Tcs upwards, for example the current refrigerant saturation temperature Tcs is updated as Tcs=Tcs+1. Simultaneously, the working time of the variable-frequency compressor Mc returns to 0 and is retimed from this moment, and an updated target refrigerant saturation temperature Tcs is used to perform the PID adjustment on the current refrigerant saturation temperature Tc constantly. Thus, controlled by the variable-frequency control module 203, the rotating speed of the variable-frequency compressor is improved so as to improve a discharging pressure at a high pressure side, such that an indoor temperature can reach a predetermined target. Simultaneously, the temperature control module 202 records the current target refrigerant saturation temperature as the initial target refrigerant saturation temperature of the next start.

Thus, the air conditioning system according to embodiments of the present invention makes an identification and determination according to influence of indoor loads on operation parameters of the refrigerating system so as to adjust the operation frequency of the variable-frequency compressor intelligently.

In Embodiment 3, as shown in FIG. 5, in the refrigerating mode, a process of adjusting the target refrigerant saturation temperature by the temperature control module 202 is similar to that in in the heating mode of Embodiment 4, and thus it is omitted herein.

In an embodiment of the present invention, the operation parameters of the variable-frequency compressor include a working time of the variable-frequency compressor and a stop-start number of time of the variable-frequency compressor in a third predetermined period, in which when the working time of the variable-frequency compressor is larger than or equal to a third time threshold, and the stop-start number of time of the variable-frequency compressor in the third predetermined period is larger than or equal to a second predetermined number of time threshold, and the target refrigerant saturation temperature is larger than or equal to a predetermined saturation temperature threshold, the temperature control module 202 adjusts the target refrigerant saturation temperature according to a predetermined step length.

Specifically, as shown in FIG. 7, in the refrigerating mode, the first pressure sensor 23 configured to detect the pressure at the low pressure side is disposed in the outdoor apparatus 2. The start module 201 controls the variable-frequency compressor to refrigerate according to the control signal indicating the mode option instruction and the control signal indicating the on-off instruction.

Moreover, if the indoor apparatus 1 is started for the first time in the predetermined working cycle, the temperature control module 202 determines the target refrigerant saturation temperature Tes according to the current ambient temperature of the outdoor apparatus 2. For example, when the current ambient temperature of the outdoor apparatus 2 is between 30° C. and 35° C., an initial target refrigerant saturation temperature may be set as 6° C.; when the current ambient temperature of the outdoor apparatus 2 is between 35° C. and 40° C., the initial target refrigerant saturation temperature may be set as 3° C.; when the current ambient temperature of the outdoor apparatus 2 is between 25° C. and 30° C., the initial target refrigerant saturation temperature may be set as 8° C. When the indoor apparatus 1 is not started for the first time in the predetermined working cycle, the temperature control module 202 sets the recorded adjusted target refrigerant saturation temperature in a last stop as the initial target refrigerant saturation temperature of the outdoor apparatus 2 in a current start.

Subsequently, the temperature control module 202 generates the current refrigerant saturation temperature Te according to the first pressure detecting signal generated by the first pressure sensor 23. And then the variable-frequency control module 203 performs a PID (Proportion Integration Differentiation) adjustment on the current refrigerant saturation temperature Te according to the target refrigerant saturation temperature Tes. The PID adjustment is illustrated as follows.

A difference between the current refrigerant saturation temperature Te and the target refrigerant saturation temperature Tes is denoted as $\Delta e = Te - Tes$. For example, the current refrigerant saturation temperature Te is 10, the target refrigerant saturation temperature Tes is 6, and then a current difference is denoted as $\Delta e0 = 10 - 6 = 4$. Since sampled data are discrete, according to a difference value of a previous $\Delta e1$ (i.e., a difference of a certain period (such as 40 s) ago) and a current $\Delta e0$ or a weighted value of the previous $\Delta e1$ and the current $\Delta e0$, feedback quantities of $\Delta e0$ and $\Delta e1$ can be determined to perform the PID adjustment so as to obtain an operation frequency variation of the variable-frequency compressor. A rotating speed of the variable-frequency compressor is equal to a sum of a current rotating speed and a rotating speed variation, and the rotating speed variation of the variable-frequency compressor is represented as $(Kp + Ki/s + Kd*s)*E(\Delta e1, \Delta e0)$, where Kp, Ki, s, Kd are predetermined constants, and $\Delta e1$, $\Delta e0$ are real-time feedback quantities.

In the embodiment of the present invention, when the working time of the variable-frequency compressor Mc is larger than or equal to a third time threshold (such as A minutes), the temperature control module 202 determines whether to adjust the target refrigerant saturation temperature Tes according to the received stop-start number of time of the variable-frequency compressor and an indoor capability requirement, i.e., the temperature control module 202 determines whether the stop-start number of time of the variable-frequency compressor in a third predetermined period (such as B minutes) is larger than or equal to a second predetermined number of time threshold (such as D times) and whether the target refrigerant saturation temperature Tes is larger than or equal to a predetermined saturation temperature threshold C, so as to determine whether it is needed to adjust the target refrigerant saturation temperature Tes.

In the embodiment of the present invention, when the working time of the variable-frequency compressor Mc is larger than or equal to the third time threshold (such as A minutes), the normally recorded stop-start number of time of the variable-frequency compressor in B minutes is larger than or equal to D times, and the target refrigerant saturation temperature Tes is larger than or equal to C, a refrigerating load of the indoor apparatus 1 is determined as relatively smaller and the temperature control module 202 adjusts the target refrigerant saturation temperature Tes according to the predetermined step length, that is, the temperature control module 202 keeps revising the target refrigerant saturation temperature Tes upwards, for example the current refrigerant saturation temperature Tes is updated as Tes=Tes+1. Simultaneously, the working time of the variable-frequency compressor Mc returns to 0 and is retimed from this moment, and an updated target refrigerant saturation temperature Tes is used to perform the PID adjustment on the current refrigerant saturation temperature Te constantly. And thus controlled by the variable-frequency control module 203, the variable-frequency compressor may lower its rotating speed so as to reduce a refrigerating capacity, such that an indoor temperature is decreased slowly and a frequent stop of the outdoor apparatus 2 is reduced. Simultaneously, the temperature control module 202 records the current target refrigerant saturation temperature as the initial target refrigerant saturation temperature of the next start.

Thus, the air conditioning system according to embodiments of the present invention makes an identification and determination according to influence of indoor loads on operation parameters of the refrigerating system so as to adjust the operation frequency of the variable-frequency compressor intelligently.

In Embodiment 6, as shown in FIG. 8, in the heating mode, a process of adjusting the target refrigerant saturation temperature by the temperature control module 202 is similar to that in the refrigerating mode of Embodiment 5, and thus it is omitted herein.

In an embodiment of the present invention, the operation parameters of the variable-frequency compressor include a working time and a working frequency or a working current of the variable-frequency compressor, in which when the working time of the variable-frequency compressor is larger than or equal to a fourth time threshold, and a current working frequency of the variable-frequency compressor is larger than or equal to a predetermined frequency threshold or a current working current of the variable-frequency compressor is larger than or equal to a predetermined current threshold, the temperature control module 202 adjusts the target refrigerant saturation temperature according to a predetermined step length.

Specifically, as shown in FIG. 10, in the heating mode, the second pressure sensor 24 configured to detect the pressure at the high pressure side is disposed in the outdoor apparatus 2. The start module 201 controls the variable-frequency compressor to heat according to the control signal indicating the mode option instruction and the control signal indicating the on-off instruction.

Moreover, if the indoor apparatus 1 is started for the first time in the predetermined working cycle, the temperature control module 202 determines the target refrigerant saturation temperature Tcs according to the current ambient temperature of the outdoor apparatus 2. For example, when the current ambient temperature of the outdoor apparatus 2 is between 7° C. and 10° C., the initial target refrigerant saturation temperature is determined as 46° C. When the indoor apparatus 1 is not started for the first time in the predetermined working cycle, the temperature control module 202 sets the recorded adjusted target refrigerant saturation temperature in the last stop as the initial target refrigerant saturation temperature of the outdoor apparatus 2 in the current start.

Subsequently, the temperature control module 202 generates the current refrigerant saturation temperature Tc according to the second pressure detecting signal generated by the second pressure sensor 24. And then the variable-frequency control module 203 performs the PID adjustment on the current refrigerant saturation temperature Tc according to the target refrigerant saturation temperature Tcs.

In the embodiment of the present invention, when the working time of the variable-frequency compressor Mc is larger than or equal to a fourth time threshold (such as E minutes), the temperature control module 202 compares the current working frequency of the variable-frequency compressor with a predetermined frequency threshold (such as F Hz) to determine whether it is needed to adjust the target refrigerant saturation temperature Tcs, or the temperature control module 202 compares the current working current of the variable-frequency compressor with a predetermined current threshold to determine whether it is needed to adjust the target refrigerant saturation temperature Tcs.

When the variable-frequency compressor works for E minutes, and the current working frequency of the variable-frequency compressor is larger than or equal to the predetermined frequency threshold (such as F Hz) or the current working current of the variable-frequency compressor is larger than or equal to the predetermined current threshold, a heating load of the indoor apparatus 1 is determined as relatively larger and the temperature control module 202 adjusts the target refrigerant saturation temperature Tcs according to the predetermined step length, that is, the temperature control module 202 keeps revising the target refrigerant saturation temperature Tcs upwards, for example the current refrigerant saturation temperature Tcs is updated as Tcs=Tcs+1. Simultaneously, the working time of the variable-frequency compressor Mc returns to 0 and is retimed from this moment, and an updated target refrigerant saturation temperature Tcs is used to perform the PID adjustment on the current refrigerant saturation temperature Tc constantly. Thus, controlled by the variable-frequency control module 203, the rotating speed of the variable-frequency compressor is improved so as to improve a discharging pressure at a high pressure side as rapidly as possible, such that an indoor temperature can reach a predetermined target. Simultaneously, the temperature control module 202 records the current target refrigerant saturation temperature as the initial target refrigerant saturation temperature of the next start.

Thus, the air conditioning system according to embodiments of the present invention makes an identification and determination according to influence of indoor loads on operation parameters of the refrigerating system so as to adjust the operation frequency of the variable-frequency compressor intelligently.

In embodiment 7, as shown in FIG. 9, in the refrigerating mode, a process of adjusting the target refrigerant saturation temperature by the temperature control module 202 is similar to that in in the heating mode of embodiment 8, and thus it is omitted herein.

In an embodiment of the present invention, the operation parameters of the variable-frequency compressor include a working time of the variable-frequency compressor, in which when the working time of the variable-frequency compressor is larger than a fifth time threshold and the variable-frequency compressor has not stopped, the temperature control module 202 adjusts the target refrigerant saturation temperature according to a predetermined step length.

Specifically, as shown in FIG. 12, in the heating mode, the second pressure sensor 24 configured to detect the pressure at the high pressure side is disposed in the outdoor apparatus 2. The start module 201 controls the variable-frequency compressor to heat according to the control signal indicating the mode option instruction and the control signal indicating the on-off instruction.

Moreover, if the indoor apparatus 1 is started for the first time in the predetermined working cycle, the temperature control module 202 determines the target refrigerant saturation temperature Tcs according to the current ambient temperature of the outdoor apparatus 2. For example, when the current ambient temperature of the outdoor apparatus 2 is between 7° C. and 10° C., the initial target refrigerant saturation temperature is determined as 46° C. When the indoor apparatus 1 is not started for the first time in the predetermined working cycle, the temperature control module 202 sets the recorded adjusted target refrigerant saturation temperature in the last stop as the initial target refrigerant saturation temperature of the outdoor apparatus 2 in the current start.

Subsequently, the temperature control module 202 generates the current refrigerant saturation temperature Tc according to the second pressure detecting signal generated by the second pressure sensor 24. And then the variable-frequency control module 203 performs the PID adjustment on the current refrigerant saturation temperature Tc according to the target refrigerant saturation temperature Tcs.

In the embodiment of the present invention, when the working time of the variable-frequency compressor Mc is larger than or equal to a fifth time threshold, the temperature control module 202 determines whether the variable-frequency compressor Mc has stopped to determine whether it is needed to adjust the target refrigerant saturation temperature Tcs.

If the working time of the variable-frequency compressor Mc is larger than or equal to the fifth time threshold and the variable-frequency compressor Mc has not stopped, a heating load of the indoor apparatus 1 is determined as relatively larger and the temperature control module 202 adjusts the target refrigerant saturation temperature Tcs according to the predetermined step length, that is, the temperature control module 202 keeps revising the target refrigerant saturation temperature Tcs upwards, for example the current refrigerant saturation temperature Tcs is updated as Tcs=Tcs+1. Simultaneously, the working time of the variable-frequency compressor Mc returns to 0 and is retimed from this moment, and an updated target refrigerant saturation temperature Tcs is used to perform the PID adjustment on the current refrigerant saturation temperature Tc constantly. Thus, controlled by the variable-frequency control module 203, the rotating speed of the variable-frequency compressor is increased and a discharging pressure at the high pressure side is increased as rapidly as possible, such that an indoor temperature can reach a predetermined target. Simultaneously, the temperature control module 202 records the current target refrigerant saturation temperature as the initial target refrigerant saturation temperature of the next start.

Thus, the air conditioning system according to embodiments of the present invention makes an identification and determination according to influence of indoor loads on operation parameters of the refrigerating system so as to adjust the operation frequency of the variable-frequency compressor intelligently.

In Embodiment 9, as shown in FIG. 11, in the refrigerating mode, a process of adjusting the target refrigerant saturation temperature by the temperature control module 202 is similar to that in in the heating mode of Embodiment 10, and thus it is omitted herein.

With the outdoor apparatus of the air conditioning system according to embodiments of the present invention, the controller of the outdoor apparatus performs the variable-frequency control on the variable-frequency compressor according to the operation parameters of the variable-frequency compressor, independent from the indoor apparatus and without transmitting corresponding control parameters between the indoor apparatus and the outdoor apparatus via a specific communication, thus reducing a complexity of the air conditioning system and saving a cost significantly.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art which embodiments of the present disclosure belong to.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An air condition system, comprising:
   an indoor apparatus; and
   an outdoor apparatus comprising
      a variable-frequency compressor;
      a controller configured to perform a variable-frequency control on the variable-frequency compressor according to operation parameters of the variable-frequency compressor for a heating operation or a refrigerating operation and independent from the indoor apparatus;
      a communicator configured to receive an on-off instruction and a mode option instruction sent from a remote, a line controller or the indoor apparatus of the air condition system;
      a first pressure sensor disposed at an inlet of the variable-frequency compressor and configured to generate a first pressure detecting signal, when a working mode of the air condition system is a refrigerating mode; and
      a second pressure sensor disposed at an outlet of the variable-frequency compressor and configured to generate a second pressure detecting signal, when the working mode is a heating mode,
   wherein the controller is configured to generate a current refrigerant saturation temperature by selecting one of the first pressure detecting signal and the second pressure detecting signal according to the working mode, to obtain a target refrigerant saturation temperature, to perform the variable-frequency control on the variable-frequency compressor according to the target refrigerant saturation temperature and the current refrigerant saturation temperature, and to adjust the target refrigerant saturation temperature according to the operation parameters of the variable-frequency compressor during the variable-frequency control,
   wherein the operation parameters of the variable-frequency compressor comprise a working time of the variable-frequency compressor and a stop-start number of time of the variable-frequency compressor in a first predetermined period,
   when the working time of the variable-frequency compressor is larger than or equal to a first time threshold and the stop-start number of time of the variable-frequency compressor in the first predetermined period is larger than or equal to a first predetermined number of time threshold, the controller adjusts the target refrigerant saturation temperature according to a predetermined step length.

2. The air condition system according to claim 1, wherein when the working mode is the heating mode, the controller reduces the target refrigerant saturation temperature by the predetermined step length and returns the working time of the variable-frequency compressor to zero;
   the controller being adapted to increase, when the working mode is the refrigerating mode, the target refrigerant saturation temperature by the predetermined step length and return the working time of the variable-frequency compressor to zero.

3. A method for controlling an air condition system, comprising:
   obtaining operation parameters of a variable-frequency compressor of an outdoor apparatus in the air condition system;
   performing a variable-frequency control on the variable-frequency compressor of the outdoor apparatus according to the operation parameters of the variable-frequency compressor for a heating operation or a refrigerating operation and independent from the indoor apparatus of the air condition system;
   detecting a first pressure detecting signal via a first pressure sensor disposed at an inlet of the variable-frequency compressor, when a working mode of the air condition system is a refrigerating mode; and
   detecting a second pressure detecting signal via a second pressure sensor disposed at an outlet of the variable-frequency compressor, when the working mode is a heating mode,
   wherein performing a variable-frequency control on the variable-frequency compressor of the outdoor apparatus according to the operation parameters of the variable-frequency compressor and independent from the indoor apparatus of the air condition system comprises:
   generating a current refrigerant saturation temperature by selecting one of the first pressure detecting signal and the second detecting signal according to the working mode;
   obtaining a target refrigerant saturation temperature;
   performing the variable-frequency control on the variable-frequency compressor according to the target refrigerant saturation temperature and the current refrigerant saturation temperature, and adjusting the target refrigerant saturation temperature according to the operation parameters of the variable-frequency compressor during the variable-frequency control,
   wherein the operation parameters of the variable-frequency compressor comprise a working time of the variable-frequency compressor and a stop-start number of time of the variable-frequency compressor in a first predetermined period, and adjusting the target refrigerant saturation temperature according to the operation parameters of the variable-frequency compressor comprises:
   determining whether the working time of the variable-frequency compressor is larger than or equal to a first time threshold;
   if yes, obtaining the stop-start number of time of the variable-frequency compressor in the first predetermined period; and
   if the stop-start number of time of the variable-frequency compressor in the first predetermined period is larger than or equal to a first predetermined number of time threshold, adjusting the target refrigerant saturation temperature according to a predetermined step length.

4. The method according to claim 3, wherein
when the working mode is the heating mode, the target refrigerant saturation temperature is reduced by the predetermined step length and the working time of the variable-frequency compressor returns to zero;
when the working mode is the refrigerating mode, the target refrigerant saturation temperature is increased by the predetermined step length and the working time of the variable-frequency compressor returns to zero.

5. An outdoor apparatus of an air condition system, comprising:
a variable-frequency compressor;
a controller configured to control the variable-frequency compressor according to operation parameters of the variable-frequency compressor for a heating operation or a refrigerating operation and independent from an indoor apparatus of the air condition system, and comprising:
a start module configured to obtain a working mode of the air condition system and to start the variable-frequency compressor according to the working mode of the air condition,
a temperature control module configured to obtain a target refrigerant saturation temperature, and to adjust the target refrigerant saturation temperature according to operation parameters of the variable-frequency compressor during an variable-frequency control for the variable-frequency compressor, and
a variable-frequency control module configured to perform the variable-frequency control on the variable-frequency compressor according to the target refrigerant saturation temperature;
a first pressure sensor disposed at an inlet of the variable-frequency compressor and configured to generate a first pressure detecting signal, when the working mode is a refrigerating mode; and
a second pressure sensor disposed at an outlet of the variable-frequency compressor and configured to generate a second pressure detecting signal, when the working mode is a heating mode,
wherein the temperature control module is configured to generate a current refrigerant saturation temperature by selecting one of the first pressure detecting signal and the second detecting signal according to the working mode and to obtain a target refrigerant saturation temperature, and the variable-frequency control module is configured to perform the variable-frequency control on the variable-frequency compressor according to the target refrigerant saturation temperature and the current refrigerant saturation temperature,
wherein the operation parameters of the variable-frequency compressor comprise a working time of the variable-frequency compressor and a stop-start number of time of the variable-frequency compressor in a first predetermined period,
the temperature control module adapted to adjust, when the working time of the variable-frequency compressor is larger than or equal to a first time threshold and the stop-start number of time of the variable-frequency compressor in the first predetermined period is larger than or equal to a first predetermined number of time threshold, the target refrigerant saturation temperature according to a predetermined step length.

6. The air condition system according to claim 5, wherein
the temperature control module adapted to reduce, when the working mode is the heating mode, the target refrigerant saturation temperature by the predetermined step length and returns the working time of the variable-frequency compressor to zero;
the temperature control module adapted to, when the working mode is the refrigerating mode, increase the target refrigerant saturation temperature by the predetermined step length and return the working time of the variable-frequency compressor to zero.

* * * * *